(12) United States Patent
Galbraith et al.

(10) Patent No.: US 6,338,115 B1
(45) Date of Patent: Jan. 8, 2002

(54) ADVANCED READ CACHE MANAGEMENT

(75) Inventors: Robert Edward Galbraith; Carl E. Forhan; Jessica M. Gisi, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/250,349

(22) Filed: Feb. 16, 1999

(51) Int. Cl.[7] .............................................. G06F 12/00
(52) U.S. Cl. ........................ 711/113; 711/136; 711/137; 711/160; 711/213
(58) Field of Search ........................ 711/111, 113, 112, 711/133, 136, 137, 159, 160, 213, 207

(56) References Cited

U.S. PATENT DOCUMENTS

| | | | |
|---|---|---|---|
| 5,293,609 A | * 3/1994 | Shih et al. ................... | 711/137 |
| 5,499,354 A | 3/1996 | Aschoff et al. .............. | 395/456 |
| 5,546,555 A | * 8/1996 | Horstmann et al. ......... | 711/207 |
| 5,608,890 A | 3/1997 | Berger et al. ................ | 395/440 |
| 5,619,676 A | 4/1997 | Fukuda et al. .............. | 395/464 |
| 5,649,153 A | 7/1997 | McNutt et al. ............. | 395/445 |
| 5,737,565 A | * 4/1998 | Mayfield ..................... | 711/213 |

* cited by examiner

Primary Examiner—Matthew Kim
Assistant Examiner—Brian R. Peugh
(74) Attorney, Agent, or Firm—Wood Herron & Evans

(57) ABSTRACT

A low complexity approach to DASD cache management. Large, fixed-size bands of data from the DASD, rather than variable size records or tracks, are managed, resulting in reduced memory consumption. Statistics are collected for bands of data, as well as conventional LRU information, in order to improve upon the performance of a simple LRU replacement scheme. The statistics take the form of a single counter which is credited (increased) for each read to a band and penalized (reduced) for each write to a band. Statistics and LRU information are also collected for at least half as many nonresident bands as resident bands. In an emulation mode, control information (e.g., statistics and LRU information) regarding potentially cacheable DASD data, is collected even though there is no cache memory installed. When in this mode, the control information permits a real time emulation of performance enhancements that would be achieved were cache memory added to the computer system. Dynamic reconfiguration of the cache size is also permitted in real time without requiring computer system downtime.

32 Claims, 9 Drawing Sheets

ADVANCED READ CACHE MANAGEMENT

FIELD OF THE INVENTION

The invention relates to a method of managing a read cache for one or more direct access storage device while using a small amount of control storage in a manner that is less likely to impede write intensive workloads or workloads that lack locality of reference.

BACKGROUND OF THE INVENTION

In a data processing system, instructions and associated data are transferred from storage devices to one or more processors for processing, and then resulting data generated by the processor is returned to storage devices. Thus, typical processing operations involve frequent and repetitive reading and writing from/to storage devices. As a result, storage access delays are often a primary limitation in the performance of a data processing system. Preferably, therefore, storage access speed should be maximized to maximize performance. However, often cost and other constraints require that the storage devices be comprised of relatively long access time circuitry, e.g., hard disk drives or other direct access storage devices (DASD's). To overcome the resulting performance drawbacks, caches are typically used.

A cache typically includes a relatively small, but relatively high speed, bank of memory, that can be more rapidly accessed by the processor(s) than the storage device that the cache services. Caches have been used to increase the performance of DASD's, and also to increase the performance of relatively low-speed solid state memory such as dynamic random access memory (DRAM).

Typically, a cache is associated with a cache directory, which stores an indication of those memory locations currently stored in the cache. Typically, a cache directory contains a number of entries, each entry identifying the address of data that is in the cache, and further identifying where the cache is currently storing that data. Thus, when a processor requests access to a particular address, the cache directory is accessed to determine whether data from that address is in the cache. If so, the requested data may be accessed in the cache, if appropriate. If the requested data is not in the cache, the requested data may be established in the cache, if appropriate.

The storage space on a hard disk or other DASD is typically arranged in arbitrarily sized data blocks. Recently, some computing systems, such as the AS/400 system available from the assignee of this application, have begun to utilize DASD's having fixed-size storage blocks. In the typical system, however, the storage space on a mainframe DASD is arranged into tracks. The size of the tracks is a function of the particular DASD being used and is not standard. Data is stored in "records" on the track. The records are of arbitrary size, and a single track may include one or many records. As a consequence of the organization used in DASD's, data in a DASD cache is also typically stored in arbitrary and non-standard size blocks. In some cases, the DASD cache will store all records in a track on the DASD, in which case the size of the data stored by the DASD is a function of the track size, and/or the size of the records on the track. In other cases, the DASD cache will store individual records, each replicating the data of a corresponding record on the DASD; in this case, because the size of the records is random, their size when stored in the cache is also random. In either case, there is variation in the size of the data stored by the cache, making it complex to manage the cache efficiently, and making it complex determine whether and where particular data is stored in the cache.

Caches have also been used to enhance the speed of solid-state memory, e.g., dynamic random access memory (DRAM). DRAM is typically arranged into pages or other fixed-sized blocks, and caches used with DRAM are typically organized into constant-size "lines", which are relatively long sequences of sequential storage locations. When DRAM locations are duplicated into such a cache, typically the needed memory location as well as a few neighboring memory locations, are brought into a line of the cache.

There are two general types of caches in use today, write caches and read caches. A write cache is primarily intended to temporarily store data being written by the processor to a storage device. The processor writes data into the write cache, and thereafter the data is transferred or destaged from the write cache to the appropriate storage device. By caching data being written to the storage device, the efficiency of the write operations can often be improved. A read cache duplicates memory locations in the storage device, for the primary purpose of increasing memory read speed. Specifically, when a particular storage location being accessed by the processor is duplicated in the read cache, the processor may rapidly access the read cache instead of waiting for access to the storage device. Although a read cache is primarily intended for storing data being read from the storage device, the data in the read cache must be updated when the processor overwrites that data in the storage device. The need to rewrite data in a read cache under these circumstances can substantially diminish the performance of the read cache.

Caches have been managed in accordance with a least-recently-used LRU replacement scheme; specifically, when a data is to be added to the cache, old data which was least recently used, is replaced with the new data. While LRU is a popular replacement scheme, it is not necessarily the most efficient. Although not necessarily widely recognized by those skilled in the art, the inventors have determined that caches are most effective when managed such that data experiencing a high degree of locality of reference is maintained in the cache while data not experiencing locality of reference is not maintained in the cache. Furthermore, the inventors have determined that a read cache is most effective when data that is frequently overwritten is not stored in the cache. A read cache using an LRU replacement scheme will not necessarily meet these criteria, where there are repeated local references are spaced apart in time. In fact, under some circumstance a read cache will provide little or no performance improvement, and cannot be cost justified.

Compounding these problems, is the current lack of any effective approach to emulating the performance of a cache under real-life operating conditions. While there have in the past been software simulations of cache performance, such simulations have been performed by making assumptions as to the nature, frequency and kind of accesses that are made by the computer system, so that a model of the real-time behavior of the computer system and cache can be developed. If the assumptions as to the nature, frequency and kind of accesses are inaccurate, then the conclusions of the simulation are likely to be inaccurate.

As a result, at the present time the only way to make an accurate evaluation of the performance that can be achieved by a cache, is to actually install the cache and monitor the resulting performance. This means that new cache hardware must be purchased, at substantial expense, before it is known whether that hardware will actually provide a sufficient performance improvement to justify the associated expense. Furthermore, the expense is not limited to hardware cost. In a typical system, cache hardware can only be changed by downing the entire computer system; thus, there can be a substantial opportunity cost to installing new cache hardware, particularly in mission-critical computer systems such as high-capacity servers that are at the core of a business' daily operations.

The invention addresses these and other difficulties through a low complexity approach to DASD cache management. Low complexity is the result of managing fixed-size bands of data from the DASD, e.g., of 256 kbytes, rather than variable size records or tracks. An important consequence of the low complexity, is that the memory consumed for cache management purposes is relatively low, e.g., only 2.5 Mbytes of control storage are needed to manage 8 Gbytes of cache memory.

The performance of the cache is further improved by collecting statistics for bands of data, as well as conventional LRU information, in order to improve upon the performance of a simple LRU replacement scheme.

To maintain low complexity, the statistics take the form of a single counter which is credited (increased) for each read to a band and penalized (reduced) for each write to a band. In the specific disclosed embodiment, the counter is limited to integer numbers between 0 and 100, and is credited by 6 for each read and penalized by 4 for each write. To improve efficiency, a band that has a statistics value of 40 or more is retained in the cache even if that band is the least recently used band; when a band is retained despite being the least recently used band, the band's statistics counter is reduced by 8, and the band is made the most recently used band.

To further enhance performance, statistics and LRU information are also collected for bands of data that are not currently resident in the cache. By collecting statistics and LRU information for at least half as many nonresident bands as resident bands, there is a substantial improvement in decisions as to whether and when to bring bands of data into the cache. Specifically, a band must achieve a certain threshold of statistics before it will be made resident in the cache. In the particular disclosed embodiment, this threshold is a statistics counter having a value of 20 or more. In this embodiment, statistics and LRU information is collected for an equal number of resident and nonresident bands of data.

This cache management approach is further configured to, if desired, collect control information (e.g., statistics and LRU information) regarding potentially cacheable DASD data, even where there is no cache memory installed. When in this mode, the control information permits a real time emulation of performance enhancements that would be achieved were cache memory added to the computer system. This emulation has the substantial advantage that it is performed in real time and in response to the actual storage accesses produced by the computer system in practical use, rather than software simulations of the behavior of the computer system, which would usually be less accurate. Due to its low complexity and low control memory usage, the control storage overhead involved in such an emulation is acceptable.

Finally, this cache management approach includes features permitting dynamic reconfiguration of the cache size, so that cache memory may be added and removed in real time without requiring computer system downtime. This feature thus avoids the opportunity cost that was previously inherent in upgrading or changing the cache hardware of a computer system.

These and other advantages and features, which characterize the invention, are set forth in the claims annexed hereto and forming a further part hereof. However, for a better understanding of the invention, and the advantages and objectives attained by its use, reference should be made to the Drawing, and to the accompanying descriptive matter, in which there is described embodiments of the invention.

DETAILED DESCRIPTION

Prior to discussing the operation of embodiments of the invention, a brief overview of a computer system in which the invention may be used is provided.

Figure 1:
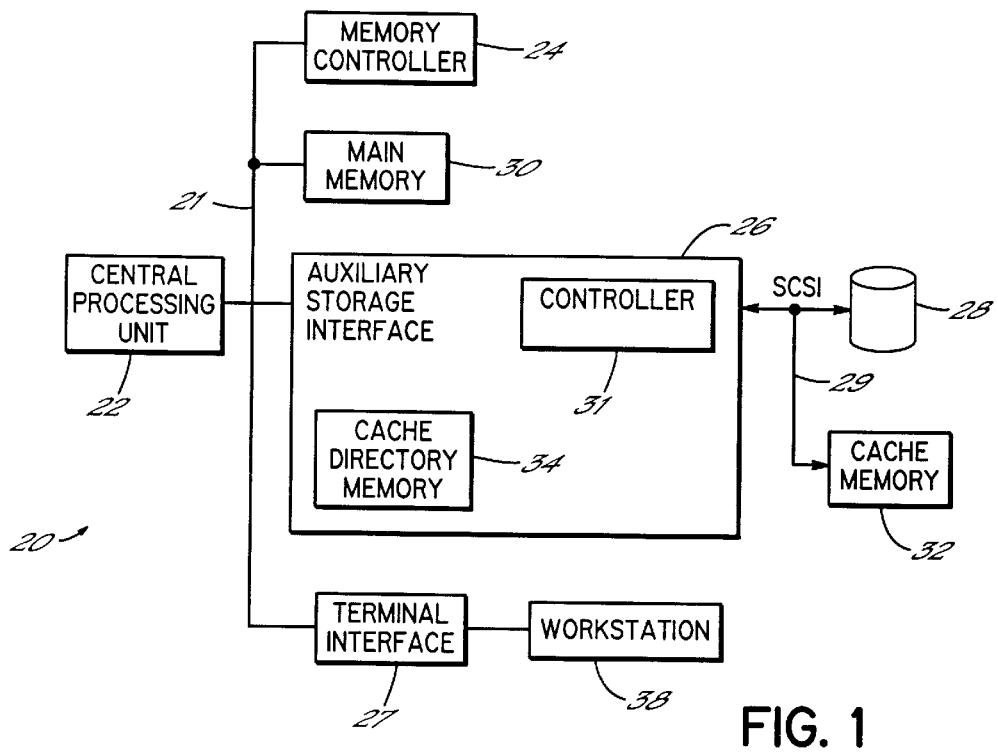
FIG. 1 is a block diagram of a computer system consistent with the invention.

Turning to the Drawing, wherein like numbers denote like parts throughout the several views, FIG. 1 shows a block diagram of a computer system 20 consistent with the invention. Those skilled in the art will appreciate that the mechanisms and apparatus consistent with the invention apply equally to any computer system, regardless of whether the computer system is a complicated multi-user computing apparatus or a single user device such as a personal computer or workstation. As shown in FIG. 1, computer system 20 includes a main or central processing unit (CPU) 22 connected through a system bus 21 to a main memory 30, a memory controller 24, an auxiliary storage interface 26, and a terminal interface 27.

Memory controller 24, through use of a processor separate from CPU 22, moves information between main memory 30, auxiliary storage interface 26, and CPU 22. While for the purposes of explanation, memory controller 24 is shown as a separate entity, those skilled in the art understand that, in practice, portions of the function provided by memory controller 24 may actually reside in the circuitry associated with CPU 22 and main memory 30. Further, while memory controller 24 of the embodiment is described as having responsibility for moving requested information between main memory 30, auxiliary storage interface 26 and CPU 22, those skilled in the art will appreciate that the mechanisms of the present invention apply equally to any storage configuration, regardless of the number and type of the storage entities involved.

Auxiliary storage interface 26, which operates under the control of software or firmware in a controller 31, allows computer system 20 to store and retrieve information from an auxiliary direct access storage device 28, such as a magnetic disk, magnetic tape or optical storage device connected to storage interface 26 via a bus 29 such as a bus conforming to Small Computer Systems Interface (SCSI) standards. Also connected to SCSI bus 29 is a cache memory 32 of volatile or non-volatile memory for storing bands of storage locations read from or written to the auxiliary storage device 28. In the specific implementation described herein, cache memory 32 comprises a solid-state direct access storage device (SS DASD); essentially, cache memory is, e.g., a 1.6 Gbyte block of volatile DRAM having a SCSI interface for connection to SCSI bus 29 and configured to be accessed in a similar manner as a hard disk or other DASD device.

Auxiliary storage interface 26 also includes a memory 34 used by controller 31 to (among other data) store a cache directory. Memory 34 is a volatile or non-volatile memory storing an indication of which memory locations are within the cache memory 32, as discussed below.

Terminal interface 27 allows users to communicate with computer system 20, normally through one or more programmable workstations 38.

Although the system depicted in FIG. 1 contains only a single main CPU and a single system bus, it will be understood that the invention also applies to computer systems having multiple CPUs and buses.

It will be appreciated that computer system 20 is merely an example of one system upon which the routines in accord with principles of the present invention may execute. Further, as innumerable alternative system designs may be used, principles of the present invention are not limited to any particular configuration shown herein.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, those skilled in the art will appreciate that computer programs for carrying the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, magnetic tape, etc., and transmission type media such as digital and analog communications links.

Figure 2:
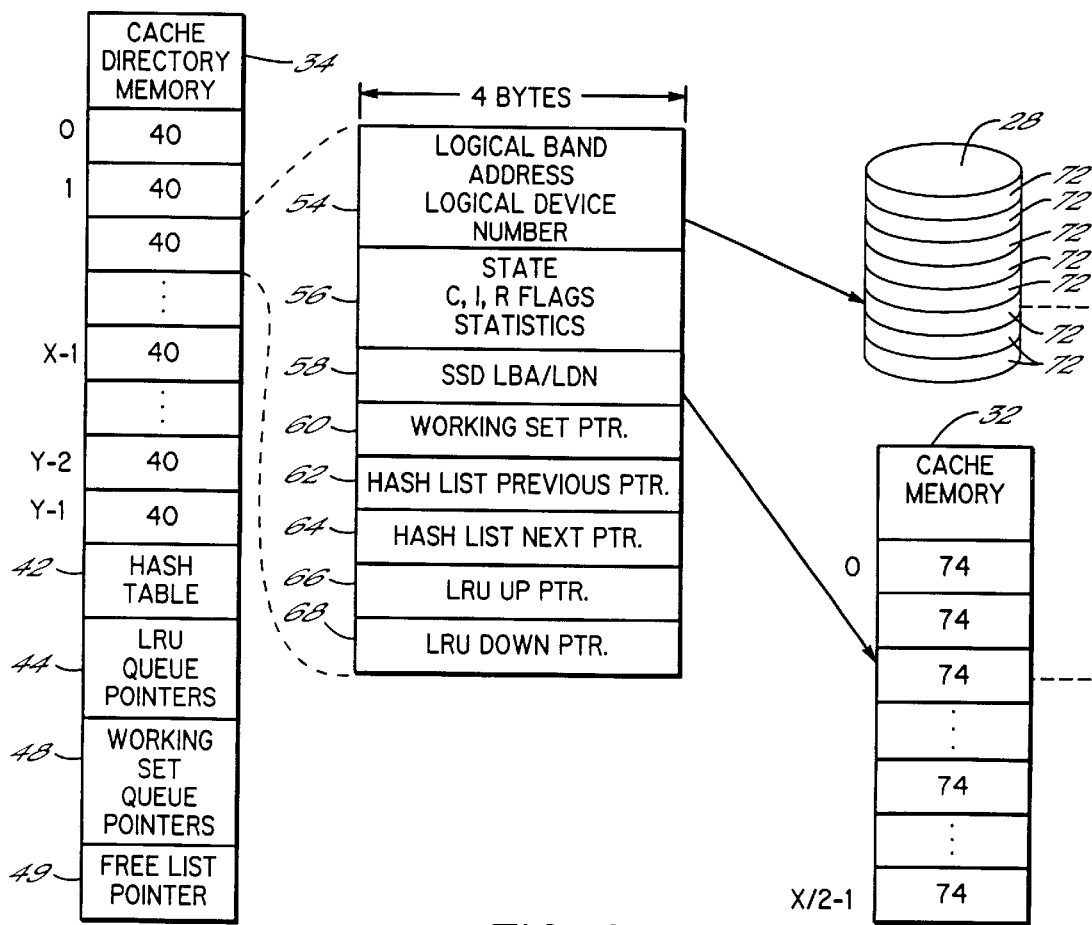
FIG. 2 is a data structure diagram showing the contents of the cache directory memory illustrated in FIG. 1.

Referring now to FIG. 2, the contents of the cache directory memory 34 can be more clearly understood. Within cache directory memory 34 are a number of records 40, which for the purposes of the following disclosure will be known as cache line or CL records. Each CL record consumes 32 bytes of storage in cache directory memory 34. One-half of the CL records are "resident" CL records, and each is used to manage the storage of a contiguous 256 kbyte band of data from the storage device 28 which is resident in the cache memory 32. The other one-half of the CL records are "non-resident" CL records, and each is used to collect information regarding a contiguous 256 kbyte band of data from the storage device 28 which is not resident in the cache memory 32 but is a potential candidate for storage in cache memory 32. It has been found that cache efficiency is improved by maintaining CL records for a substantial number of nonresident bands of data, as compared to the number of resident bands of data. For example, there should be at least half as many nonresident CL records as resident CL records. For the purposes of the present disclosure, an equal number of nonresident CL records and resident CL records are maintained, but in other embodiments the number of resident and nonresident CL records may be different.

As illustrated in FIG. 2, the cache directory includes a number, y, of CL records. The cache directory is allocated to include enough CL records to accommodate the largest cache memory that may be installed. Accordingly, if less than the maximum cache memory is installed, some CL records will not be in used. In the general case, where the cache memory 32 includes the number x/2 times 256 kbytes of storage space, x CL records will be in use, where $x \leq y$. The size of the cache memory and the number of CL records available for managing the cache memory can be arbitrarily chosen based on desired performance.

In addition to the CL records, the cache directory memory 34 includes a hash table 42, used as an index to locate a CL record for a particular storage location, as discussed below. Memory 34 also includes a number of pointers. Specifically, there are a plurality of LRU queue pointers 44, including one "head" and one "tail" pointer used in identifying the beginning and end of a queue of resident CL records, and one "head" and one "tail" pointer used in identifying the beginning and end of a queue of nonresident CL records. Also, there are a plurality of working set queue pointers 48, one for each of several read or write operations that may operate on the cache, used in identifying a working set of CL records that are included in a working set for the associated operation. Finally, there is a free list pointer 49, used in maintaining a list of available CL records. The use of these pointers will be discussed below with reference to FIG. 3.

The detailed internal structure of a CL record is also illustrated in FIG. 2. The CL record is divided into eight four-byte fields, each of which stores data needed for management of the cache directory. A first four-byte field 54 stores a logical band address for the band of data being managed by the CL record. It can be seen in FIG. 2 that storage device 28 and cache memory 32 are, for the purposes of cache management, divided into contiguous 256 kbyte bands 72, each starting and ending at a 256 kbyte boundary in the storage device. Typically a subset of the bands in storage device 28 are associated with CL records being managed by the cache at any given time.

The logical band address in field 54 is associated with the address of the first block, on a storage device 28, of the 256 kbyte band of data that is being managed by the CL record, In a particular embodiment, addresses on storage device 28 and other storage devices in use, are in the form of a 32-bit logical block address, where the 32-bit logical block address uniquely identifies a 512 byte block of storage space on the storage device. In this implementation, the logical band address for a band including a block, can be formed from the logical block address of the block, by removing the nine lowest order bits from the logical block address. The remaining 23 more significant bits comprise the logical band address for the band including the block.

The first four-byte field 54 in a CL record also stores an 8-bit logical device number for the storage device 28 in which the data band 72 managed by the CL record is stored. Multiple logical storage devices may be managed by the auxiliary storage interface 26 illustrated in FIG. 1 using the cache; the logical device number identified in field 54 indicates which of these storage devices is storing the managed 256 kbyte band of data. In combination, the 23-bit logical band address and 8-bit logical device number in field 54 point to a specific band 72 in a particular storage device 28 attached to the auxiliary storage interface 26, as illustrated in FIG. 2.

The second four byte field 56 stores various information regarding the state of the band 72 being managed by the CL record in the cache. First, field 56 includes state information regarding the use of the CL record. Specifically, a CL record may have one of four states:

SO (statistics only)—indicates that the CL record is being used only to collect statistics on the use of the corresponding band, but that band is not presently resident in the cache. As will be seen below, all nonresident CL records are in the SO state, and only nonresident CL records are in the SO state.

Idle—if the logical band address/logical device number in field 54 is valid, indicates that the band managed by the CL record is currently resident in the cache, and the data in the cache is currently available and not being read or written at the present time.

RIP (read in progress)—indicates that the band managed by the CL record is currently resident in the cache, but that the data is currently being read by a cache management process and accordingly is not currently available.

PIP (populate in progress)—indicates that the band managed by the CL record is being filled by a cache management process with data from the corresponding band 72 in storage device 28, or with data written to that band by a processor, and accordingly the band is not available.

As will be noted below in detail, a CL progresses through these states in a controlled manner, moving from one state to another as respective write and read operations are performed upon the CL record. As is described below, as an operation is performed on a working set of CL records, the state of each CL record that is involved in the operation, is updated to the appropriate state. Furthermore, when an operation attempts to build a working set for an operation, the state of each CL record in the working set is evaluated, and if the state of the CL record is inconsistent with the operation to be performed, the operation is not performed on the CL record, thus preventing collisions between operations, i.e., attempts to use the same CL record and associated data for inconsistent purposes at the same time.

For example, read operations are only permitted if all of the CL records for the bands 72 accessed by the read operation are in the Idle state. If this is not the case, for example, if data from a particular band is being filled into the cache, and thus the associated CL record is in the PIP state, as part of preparing to perform the read operation, the read operation will detect that a CL record needed for the read operation is in the PIP state. As a result, the read operation will be suspended. A similar sequence of events will occur if any of the CL records needed for a read operation is in the process of being read and thus is in the RIP state. Only if none of the CL records for bands 72 accessed by a read operation are in the PIP or RIP state, will the read operation proceed; and when a read operation proceeds, the state of all CL records will be changed from the IDLE to either the RIP state or, in some particular circumstances described below, to the PIP state, to indicate that an operation is in progress using the CL record.

In the event of a collision of the kind described above, a flag in the CL record is set to indicate the occurrence of a collision. This flag "C", also known as the collision bit, is included in field 56 of each CL record 40. When a collision is detected and an operation is suspended, the collision bit in the CL record which caused the collision is set. As discussed below, when an operation which uses a CL record terminates, that operation reviews the CL record to determine whether the collision bit is set, and if so, the previously suspended operation which experienced the collision is restarted.

Collisions may occur during read operations, as described above, or during write operations as elaborated in detail below. It should be noted, however, that since the cache described herein is a read cache, a write operation, when not suspended due to a collision, will always save the written data to the storage device 28 as well as, if necessary, to the cache memory 32. Thus, the cache described herein does not in any way enhance the performance of write operations since all such operations must utilize the storage device 28. Indeed, write operations to bands resident in the cache reduce the overall efficiency of the computer system because the write operation must be replicated in the cache and the storage device 28. It is for this reason that the control procedures described below endeavor to identify, through the use of statistics, bands which are encountering an excessive number of write operations, and remove these bands from the cache.

Since the read cache described herein does not improve the efficiency of write operations, in an implementation of the invention, the read cache described herein would likely be combined with an upstream write cache, for example of the type described in copending and commonly assigned U.S. patent application Ser. No. 09/18,175, filed on Feb. 3, 1998 in the name of Bauman et al. and entitled "DESTAGE OF DATA FOR WRITE CACHE", the entirety of which is hereby incorporated by reference. A write cache could be implemented within the hardware of the storage interface 26 using controller 31 and areas of directory memory 34 not described in the present application.

It should further be noted that, as detailed below, a read operation will only utilize the cache memory 32 if the data for all of the bands 72 that are to be read, are either in the cache and in the IDLE state, or should be made resident in the cache as a part of performing the read operation. If there are bands accessed by a read operation which are not in the cache memory 32 and not, based on an evaluation of the statistics for the band, worthwhile to be brought into the cache memory 32, then the read operation must in any event directly access the storage device 28 for the desired data, and in this case all of the desired data is obtained from the storage device 28 without using the cache.

As a consequence of the parallel execution of multiple read and write operations, it is possible that while a CL record is in use by a first operation, a second operation may determine that the CL record should be invalidated, e.g. because the band managed by the CL record is encountering an excessive number of write operations and as a result is diminishing the overall efficiency of the cache. In this case, a flag in the CL record is set to indicate that upon completion of the first operation, the CL record should be invalidated. This flag "I", also known as the invalidate bit, is included in field 56 of each CL record 40.

In the specific embodiment of the invention described below, the amount of cache memory 32 may be dynamically increased or decreased at run-time. When the amount of cache memory is decreased at run time, either due to removal of a cache memory SSDASD, or due to a hardware failure, it is desirable to remove corresponding CL records at the same time. Of course, it is possible that a CL record that is to be removed, is in use at the time it is designated for removal. In this case, a flag in the CL record is set to indicate that upon completion of the operation using the CL record, the CL record should be removed. This flag "R", also known as the remove flag, is included in field 56 of each CL record 40.

As discussed below, when an operation which uses a CL record terminates, that operation reviews the CL record to determine whether either of the remove or invalidate flags is set, and if so, the CL record is removed or invalidated, as appropriate.

Also included in field 56 of each CL record 40 is a statistics field. This field is used to collect information on the use that has been made of the band of data managed by the CL record. In the specific embodiment described herein, the statistics field is a 2 byte (16-bit) counter having a positive integer value from 0 to 100, although other count ranges may be used. As described in detail below, when a read operation is made to a band which is being managed by a CL record, the statistics counter is increased by an amount such as 6, to reflect that there is or would be a benefit to including this band in the cache. When a write operation is made to a band which is being managed by a CL record, the statistics counter is decreased by an amount such as 4, to reflect that there is or would be a penalty to including this band in the cache.

Each CL record further includes a field 58 which identifies the location in cache memory 32 of the data being managed by the CL record. Specifically, field 58 stores the SSDASD logical band address and logical device number, which together completely identify the location of a band 74 in the SSDASD which forms the cache memory 32, where the data managed by the CL record is stored. That is, the data in the band 74 in cache memory 32 identified by field 58, is a copy of the data in the band 72 in storage device 28 identified by field 54, as indicated by a dotted line in FIG. 2. Note that nonresident CL records do not manage data that is in the cache; accordingly, field 58 is not used in nonresident CL records.

As seen in FIG. 2, each CL record further includes a field 60 for storing a working set queue (WSQ) pointer. This pointer is used as noted below when incorporating a CL record into a working set. Working sets of CL records are established as part of each read or write operation performed on the cache. Working sets take the form of linked lists of CL records, with the WSQ pointer 60 in each CL record in the list identifying the next CL record in the list.

CL records further include fields 62 and 64 for storing "previous" and "next" pointers. These pointers are used as noted below to index a CL record into a doubly-linked list headed by one of the hash table entries, so that the CL record for a particular storage location can be rapidly identified from the address of that storage location.

CL records also include fields 66 and 68 for storing "up" and "down" pointers. These pointers are used as noted below to incorporate a CL record into a doubly-linked list which forms one of the two LRU (least recently used) queues of CL records. There is one such LRU queue for resident CL records and one such queue for nonresident CL records.

Figure 3:
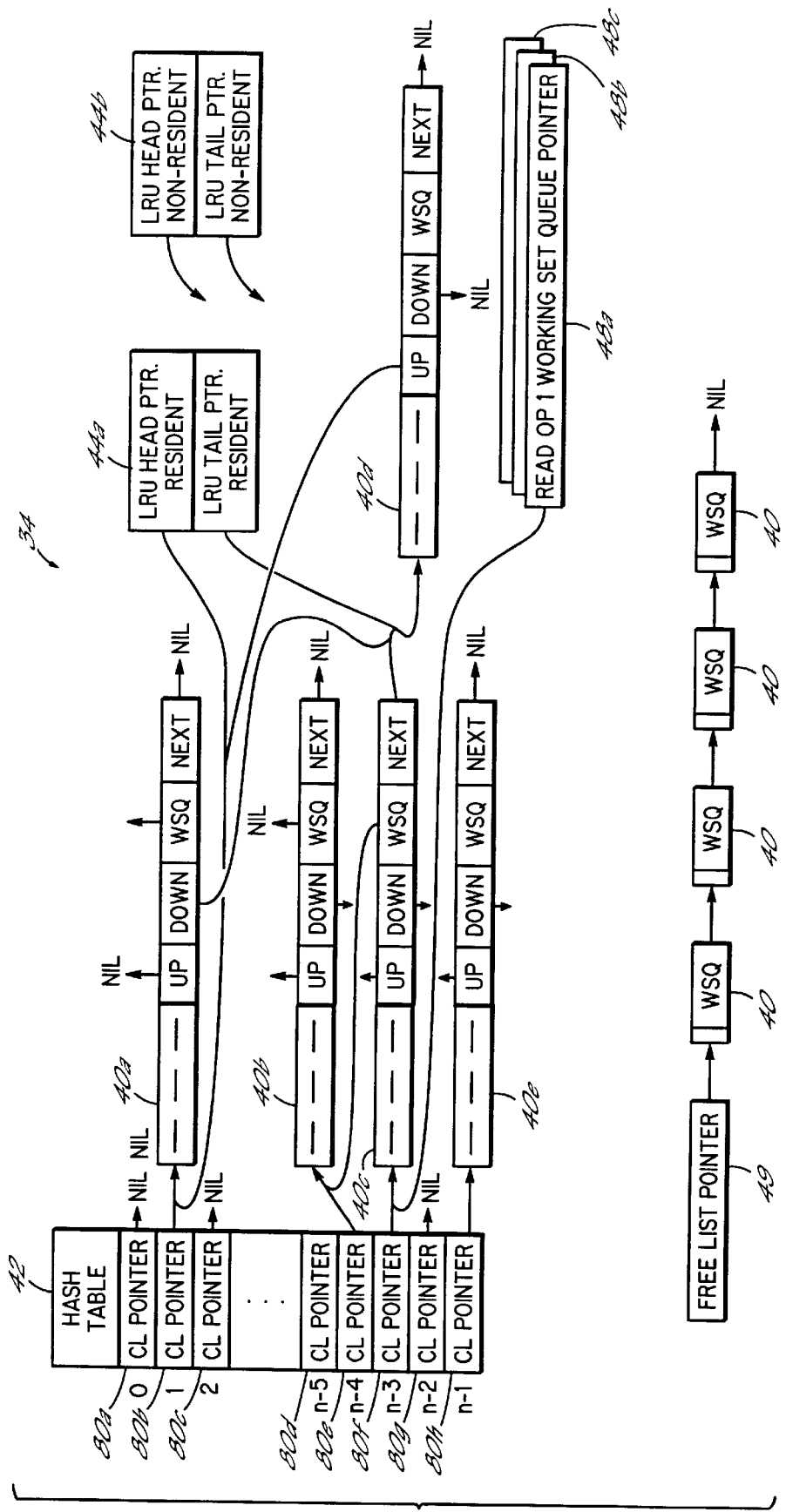
FIG. 3 is a data structure diagram showing the organization of the contents of the cache directory into lists and queues using pointers included in the data structures.

Referring now to FIG. 3, the arrangement of the CL records into lists and queues can be explained.

Initially, it will be noted all resident CL records corresponding to storage device bands now replicated in the cache memory, and all nonresident CL records managing statistics and LRU information for storage device bands not currently replicated in the cache memory, are indexed into the doubly-linked lists which extend from the hash table 42. The hash table 42 includes a number, n, of entries 80, each of which stores a CL record pointer.

The index into the hash table is a proper number of low order bits of the logical band address, or an equal number of low order bits of a logical block address of a block in the band excluding the nine lowest order bits of the logical block address. Thus, to locate a CL record, if any, which is managing cached data for a given block in a storage device, the logical block address is stripped of its nine least significant bits, and the appropriate number of the remaining low order bits of the address (e.g., 17 bits, where a 128k entry hash table is used) are used as an index into the hash table. This process will identify one of the entries 80 in the hash table. If data for the desired block is in the cache, there will be a CL record in the doubly-linked list of CL records that extends from the located entry 80 in the hash table. To locate the CL record, the pointer in the located entry 80 is followed to the first CL record in the list, and the logical band address and logical device number in field 54 of this CL record are compared to the desired address and device. If there is a match, then the CL record is managing statistics and LRU information for the desired band. If there is no match, then the next pointer in field 64 of the current CL record is followed to the next CL record in the list. This process continues until a CL record is located for the desired band, or the last CL record in the list is reached. The last CL record in the list has a NIL value next pointer in its field 64.

FIG. 3 illustrates lists of CL records, headed by entries 80*b*, 80*e*, 80*f* and 80*h* of hash table 42. Entries 80*b*, 80*e*, 80*f* and 80*h* contain pointers leading to CL records 40*a*, 40*b*, 40*c* and 40*e*, which are the respective first CL records in the lists headed by entries 80*b*, 80*e*, 80*f* and 80*h*. The other hash table entries 80*a*, 80*c*, 80*d* and 80*g* contain NIL valued pointers, indicating that there are no CL records, and no data in the cache, for addresses in storage device 28 which correspond to those entries.

It will be noted that lists of CL records can include one or multiple CL records. The lists headed by entries 80*b*, 80*e* and 80*h* of hash table 42 have single entries, namely CL records 40*a*, 40*b* and 40*e*, respectively. The list headed by entry 80*f* of hash table 42 has two entries, CL records 40*c* and 40*d*. The next pointer in field 64 of entry 40*c* leads to CL record 40*d*. The next pointer in field 64 of CL record 40*d* has a NIL value, indicating that CL record 40*d* is the last CL record in the list.

It will be noted that the lists of CL records are doubly-linked lists, that is, each CL record has a next pointer in field 64 which leads to the next CL record in the list, or has a NIL value if there is no next record, and also has a previous pointer in field 62 which leads to the previous CL record in the list. Thus, the previous pointer (not shown) in field 62 of CL record 40*d* leads to CL record 40*c*.

All of the CL records currently in use are included in the lists which extend from hash table 42. CL records which are managing data resident in the cache are listed along with CL records that are managing data that is not resident in the cache. Resident CL records will be in one of the Idle, RIP or PIP states; nonresident CL records will always be in the SO state and can be identified as such.

The size of the hash table can be chosen arbitrarily, however, for efficiency it is preferred that the hash table have approximately twice as many entries 80 as the number of CL records 40 needed for the maximum cache size, so that on average the number of CL records listed by a hash table entry is less than one.

Other lists of CL records are generated as operations are performed on the cache. Specifically, a working set of CL records is established prior to each write or read operation performed on the cache. As noted above, there are working set pointers 48 which head these lists, one pointer used for each operation that is pending in the cache. One working set, comprised of CL records 40c and 40b, is illustrated in FIG. 3. The working set pointer 48a for the read operation that built this working set, points to CL record 40c. The WSQ pointer in field 60 of CL record 40c points to CL record 40b. The WSQ pointer in field 60 of CL record 40b has a NIL value, indicating that CL record 40b is the last CL record in the working set.

The number of CL records that may be included in a working set depend on the relative size of the storage device bands and the data range of the operation. In the particular implementation described herein, the maximum operation size permitted by the storage device 28 is 256 kbytes, and accordingly a maximum of two 256 kbyte cache bands will be affected by any one operation. Accordingly, the working set for an operation will be either one or two CL records.

The cache directory memory 34 also includes LRU head and LRU tail pointers 44 used to identify LRU queues of resident and nonresident CL records. The resident and nonresident LRU head and LRU tail pointers 44a and 44b, respectively, are illustrated in FIG. 3. The resident LRU head pointer 44a leads to CL record 40a, which is the most recently used CL record among the resident CL records in the resident LRU queue. The LRU tail pointer 44b leads to CL record 40d, which is the least recently used resident CL record.

The CL records in the LRU queues are linked together in a doubly-linked list in order from most recently to least recently used. Thus, CL record 40a has a pointer in its down field 68 leading to the first less recently used CL record in the queue, which in the illustrated situation is CL record 40d. CL record 40a also has a pointer in its up field 66 leading to the first more recently used CL record in the queue, which in the illustrated situation has a NIL value because CL record 40a is the most recently used resident CL record. Similarly, CL record 40d has a pointer in its up field 66 leading to the first more recently used CL record in the queue, which in the illustrated situation is CL record 40a, and CL record 40d has a pointer in its down field 68 leading to the first less recently used CL record in the queue, which in the illustrated situation has a NIL value because CL record 40d is the least recently used CL record in the queue for the first storage device.

It will be noted in FIG. 3 and in the following description, that all CL records managing data for bands are in either the resident or nonresident LRU queue. There may, however, be CL records allocated for use in case the amount of cache memory 32 is dynamically increased, as discussed in more detail below. Any allocated CL records which are not in use, are kept on a free list, which is a singly-linked list of CL records that are not currently in use. As illustrated in FIG. 3, the first CL record on the free list is identified by the free list pointer 49. The first CL record on the free list includes in its working set queue pointer 60, a pointer to the second CL record on the free list. Subsequent CL records on the free list are similarly linked using working set queue pointers. The last CL record on the free list has a NIL value in its working set queue pointer 60.

With respect to storage consumption of the directory structure shown in FIG. 3, in the specific embodiment described herein, each CL record manages a band of 256 kbytes of storage device memory. As one example, if the maximum size of cache memory 32 is 1 gigabyte, management of the 4028 256 kbyte bands that may be resident in the cache and an equal number of bands which are not resident, would require 4028 32-byte nonresident CL records and 4028 32-byte resident CL records, for a total of 256 kbytes of control storage in memory 34 consumed by CL records. A suitable hash table for this embodiment would be 64 kbytes in length, resulting in a total control storage consumption of approximately 320 kbytes for the cache directory. Expansion of the maximum cache memory size to 4 or 8 gigabytes would require a proportional expansion in the number of CL records and hash table size, resulting in control storage consumption of approximately 1.25 Mbytes and 2.5 Mbytes, respectively. The specific embodiment described herein is configured for a maximum cache memory size of 8 gigabytes.

Referring now to FIGS. 4–7, operation and use of the cache directory structure by controller 31 during operation of a read cache can be discussed.

Figure 4A:
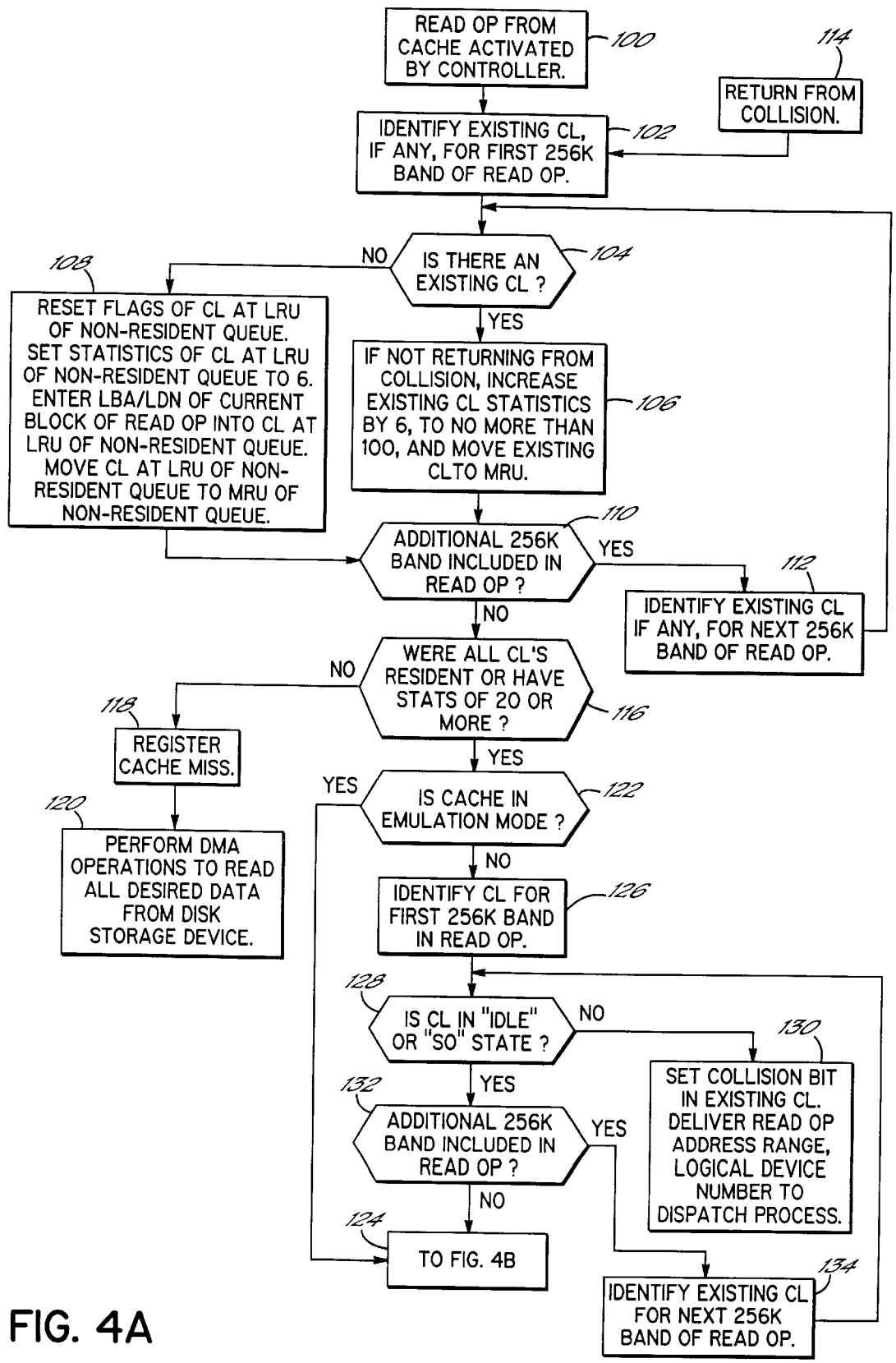
FIGS. 4A, 4B and 4C are flow charts of specific operations performed as part of responding to a read request, including checking for collisions, modifying statistics and LRU queues, determining whether one or more data bands is to be made resident and if so selecting a data band for replacement, and performing DMA operations to return data to the processor and, if necessary, filling data into bands in the cache memory.

Specifically, referring to FIG. 4A, when a read operation is activated by the auxiliary storage interface controller 31 (step 100), as a first step, the statistics in any CL records that are involved in the read operation are updated. Specifically, in step 102, the hash table is referenced to identify any CL in the cache directory for the first 256 kbyte band of the read operation, if any. If (step 104) there is a CL for the band, then in step 106 the statistics of the CL are credited to reflect the read operation, specifically, the statistics in field 56 are incremented by 6 to not more than 100. At the same time, the CL is moved to the head (most recently used position) of the resident or nonresident LRU queue, as appropriate.

If in step 104, there is not already a CL for an accessed band in the cache, then in step 108 steps are taken to add a nonresident CL for the band to the cache, so that statistics and LRU information for the band will be collected by the cache so that it can be determined whether the band should be brought into the cache. In this operation, the least recently used nonresident CL in the cache directory is replaced. Accordingly, the flags in the CL at the LRU end of the nonresident queue are reset, and the statistics of this CL are set to a value of 6 to reflect that a read operation has occurred. Furthermore, the logical band address/logical device number identified in field 54 of the CL are changed to identify the logical band address/logical device number of the band being accessed by the read operation. Finally, the CL is moved to the head (MRU) end of the nonresident LRU queue.

After step 108 or 106, it is determined in step 110 whether the read operation includes addresses in a second 256 kbyte band in storage device 28. If so, in step 112, the hash table is utilized to identify any CL in the cache directory that is managing LRU and statistical data for the second 256 kbyte band, and then the processing returns to step 104 to take the appropriate action based on whether there is a CL in the cache.

It will be noted that, if a read operation is suspended due to a collision, after the collision is resolved the read operation will restart by proceeding from step 114 to step 102, to pass through the loop described above and determine whether all CL's for the operation are in the cache directory, and if not, establish them in the cache. If the above-described operations are being performed after return from a collision, it is no longer necessary to update the statistics of CL's for a band that are present in the cache, nor is it necessary to move such CL's to the head of the LRU queue. Accordingly, after a return from the collision, the operations described in step 106 are not performed.

After all bands affected by a read operation have been processed by the loop described above, control passes from step 110 to step 116 in which it is determined whether all of the CL's that were identified in this loop, were either resident in the cache or had sufficient statistics to justify bringing the corresponding data into the cache. If one of the bands did not have a CL in the cache directory, or had a nonresident CL with statistics less than 20, then some of the data for the read operation is not in the cache and will not be brought into the cache. Accordingly, as noted above, under these circumstances the cache is not used, and control passes from step 116 to step 118 where a cache "miss" is registered, and then step 120 in which the appropriate DMA operations are performed to read all desired data from the DASD storage device 28.

If in step 116, all of the data for a read operation is either in the cache or is to be brought into the cache, then control passes from step 116 to step 122. The following steps in FIG. 4A are directed to detecting collisions between concurrent operations being performed in the cache. This processing is only required if the cache is not currently in its emulation mode. If the cache is in its emulation mode, therefore, control passes to FIG. 4B (step 124). If the cache is not in its emulation mode, then collision processing is performed by proceeding to step 126 and the following loop of steps described below. In each iteration of this loop, the cache directory is reviewed to identify whether there is an existing CL record in the cache directory managing data for the same storage device locations as the data being read as part of the current read operation. The loop begins in step 126 by identifying the existing CL record which is managing data for the first band of data being read by the current operation.

In step 128, it is determined whether the located CL record is in the RIP or PIP state. If the CL record is in the RIP or PIP state, there is a conflict between the current operation and another operation. In this case, the conflict is resolved by stalling execution of the current operation. Specifically, in the event of a conflict, control passes to step 130 in which the collision bit in the existing CL record is set, and the address range for the operation, and the logical number of the storage device to which the operation is directed, are delivered to a dispatch process. This information is held in a queue, so that the dispatch process can subsequently re-activate the read operation when the collision is resolved, as described below. After stalling execution of the operation in this manner, processing of the operation is completed until re-initiated by the dispatch process, at which time processing will re-commence at step 114, as discussed above.

If in step 128, the CL record for a band is in either the IDLE or SO state, then in step 132 the address range of the operation is analyzed to determine if there are any bands to be read that have not yet been checked for collisions. If there are additional bands to be checked, then the loop proceeds to step 134 and identifies the CL record which is managing data for the storage locations in the next band of data being read by the current operation. Processing then returns to step 128, to analyze this band for collisions. Once every band of a read operation have been analyzed for collisions, as determined in step 132, then processing continues to FIG. 4B (step 124).

Figure 4B:
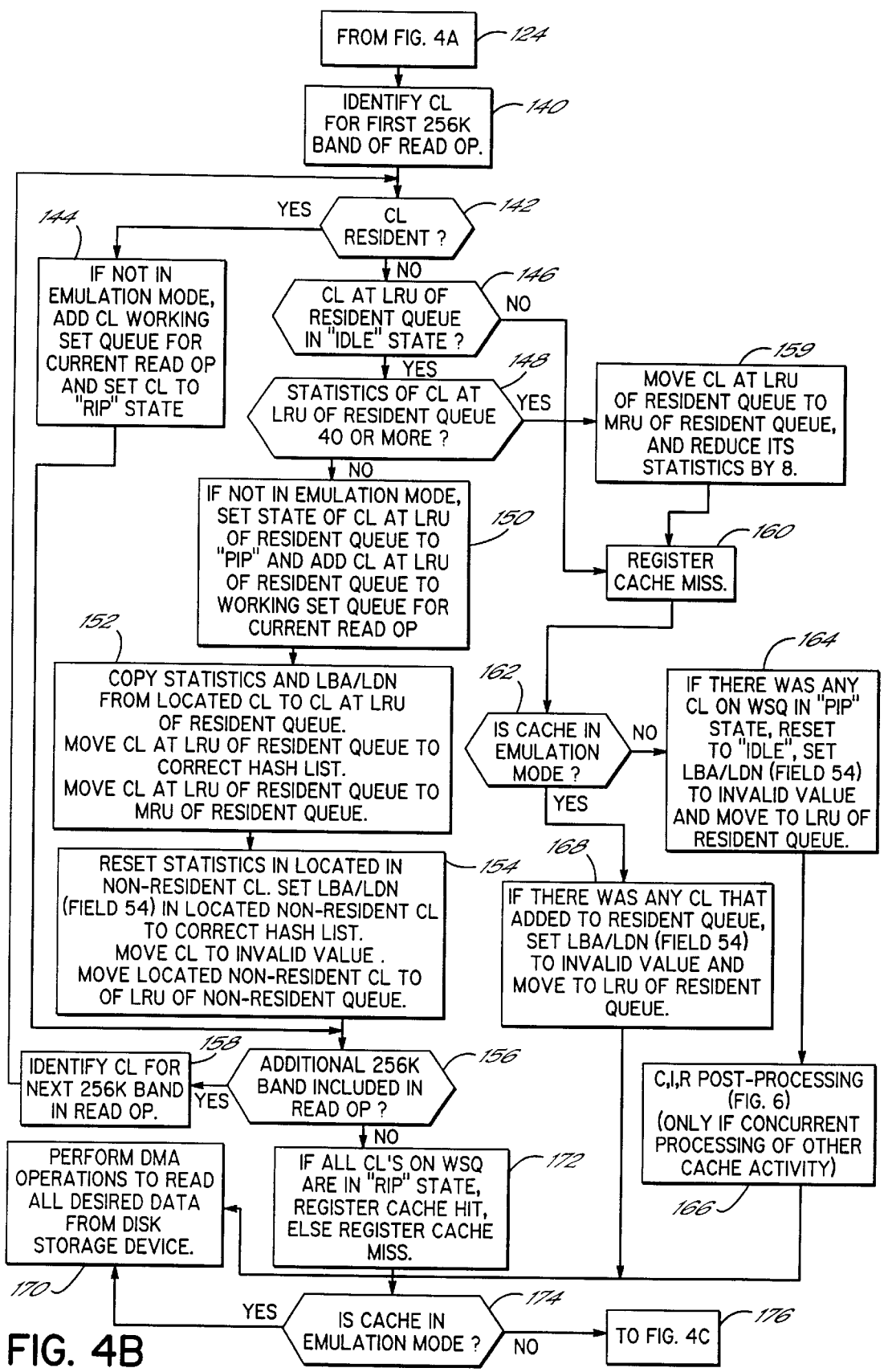

Referring now to FIG. 4B, processing continues with a loop of steps that will build a working set queue of CL records and, if necessary and appropriate, move a CL record for a band of data being read from the nonresident LRU queue to the resident LRU queue. In a first step 140, the hash table is referenced to locate the CL record for the first 256 kbyte band of data being accessed. Next, in step 142, it is determined whether this CL is resident in the cache. If the CL is resident in the cache, in step 144 the CL is added to the working set queue for the current operation, and is set to the RIP state to indicate that a read from the CL is now in process. Note, however that if the cache is in its emulation mode, it is not necessary to build a working set queue or change CL states, since no actual operations will be performed in the cache; therefore, when in emulation mode, the operations of step 144 are not performed.

If in step 142, the CL for a 256 kbyte band of data is not resident in the cache, the steps are taken to confirm that the data for the band can and should be brought into the cache. The data will be brought into the cache by utilizing the band in cache memory 32 that was least recently used. This is accomplished by updating the CL record at the LRU end of the resident queue, with the appropriate information for the new band of data to be brought into the cache. First, however, it must be confirmed that the CL record at the LRU end of the resident queue is available for use. Thus, in step 146, it is determined whether the CL at the LRU end of the resident queue is in the IDLE state. If not, there is a conflict with another operation.

If the CL at the LRU end of the resident queue is in the IDLE state, then in step 148 the statistics of the CL at the LRU end of the resident queue are evaluated to determine whether this data should be replaced. Specifically, if the statistics in the CL at the LRU end of the resident queue are 40 or more, this indicates that there is a substantial performance benefit to retaining the corresponding data in the cache.

Only if the statistics of the CL at the LRU end of the resident cache are less than 40, will the data managed by the CL at the LRU end of the resident cache be replaced, by proceeding to step 150. In step 150, the state of the CL at the LRU end of the resident queue is set to PIP and that CL is added to the working set queue for the current operation. Note, however, that in emulation mode neither of these operations is necessary or performed.

After step 150, in step 152 the statistics and logical band address/LBN information, are copied from fields 54 and 56 of the nonresident CL currently associated with the data band being read by the read operation, to the CL at the LRU end of the resident LRU queue. Then the CL at the LRU end of the resident LRU queue is moved to the appropriate hash table list for the new logical band address/logical device number of that CL. Finally, the CL at the LRU of the resident queue is moved to the MRU end of the resident queue to reflect that it is the most recently accessed data.

To complete the transfer of the CL information from the nonresident to the resident queue, in step 154 the statistics in the nonresident CL are reset, and the logical band address/logical device number of that CL are set to invalid values to indicate that the nonresident CL is now invalid (this can be done, for example, by setting the MSB of the logical band address to a "1" value if the allowable addresses all have an MSB value of "0"). Finally, to speed reuse of the invalidated nonresident CL, it is moved to the LRU end of the nonresident LRU queue, so that it will be the first CL chosen for replacement.

After step 154 or step 144, in step 156 it is determined whether there is a second 256 kbyte band in the storage device 28 being accessed, and if so, in step 158 the CL record in the cache directory for this second 256 kbyte band is identified, and control returns to step 142 to process this CL record as described above.

As noted above, in steps 146 or 148 it may be determined that there is a conflict preventing the re-use of the cache memory band associated with the CL record at the LRU end of the resident queue. Under such circumstances, one could proceed to the next least recently used CL record in the resident LRU queue to determine whether that CL record should be replaced, and if not, continue to the next least recently used CL record in the resident LRU queue. Such a process should be limited so that, for example, only the ten least recently used CL records in the resident queue are inspected for possible replacement before the attempt to replace is aborted. In the implementation described in the present application, only the one CL record at the LRU end of the resident LRU queue is inspected for possible replacement, and if there is a conflict for that CL record, then the attempt to replace is aborted.

Specifically, if in step 148 it is determined that the CL at the LRU end of the resident queue should not be removed because its statistics are greater than 40, then in step 159, the CL at the LRU end of the resident LRU queue is moved to the MRU of the LRU queue and its statistics are reduced by 8. Processing then proceeds to step 160. Processing also proceeds to step 160 if in step 146 it is determined that the CL at the LRU end of the resident queue is not in the IDLE state and thus is in use by another operation. In step 160, a cache miss is registered. After step 160, if (step 162) the cache is not in its emulation mode, in step 164 the CL's, if any, that have already been added to the working set queue for the current operation are reset to their original IDLE state. Furthermore, any CL's that were initialized and placed in the PIP state (through steps 150, 152 and 154), for data to be subsequently brought into the cache, are invalidated because that data will not be brought into the cache. Specifically, in step 164 any CL on the working set queue for the current read operation that is in the PIP state, i.e., that was to be populated by data read from the storage device 28 as part of the read operation, is reset to an IDLE state and invalidated by setting its logical band address/logical device number values in field 54 to an invalid value and moving the CL to the LRU end of the resident LRU queue. Next, any CL's in the RIP state must be reset to IDLE. In the illustrated embodiment, this is done in step 166, by performing the post processing operations described below with reference to FIG. 6. As discussed below, this post-processing not only resets all CL's on the working set queue back to the IDLE state, but also detects collisions, removals or invalidations that may have occurred or been requested by other operations. It should be noted that collisions, removals and invalidations could only have occurred or been requested if another, concurrent cache management process attempted to access a CL on the working set queue for the read operation, between the processing of step 144 or step 150 of FIG. 4B, and the processing of step 166 of FIG. 4B. If the steps illustrated in FIG. 4B are conducted in a single thread and without concurrent processing of any other operations, then collision, removal and invalidation processing is unnecessary, and step 166 could simply involve resetting all CL's on the working set queue for the current operation that are in the RIP state, back to the IDLE state.

If the cache is in emulation mode when a conflict arises when attempting to bring data into the cache, it is not necessary to reset CL states since those states are not changed. However, it is still necessary to invalidate any CL that was initialized for data that was to be brought into the cache. Accordingly in emulation mode, instead of performing steps 164 and 166, in step 168 any CL that was added to the resident queue via step 152, is invalidated by setting its logical band address/logical device number values in field 54 to an invalid value and moving the CL to the LRU end of the resident queue.

After step 166 or step 168, due to the conflict detected as described above, the read operation is performed directly in the storage device without use of the cache. Accordingly, control passes to step 170 in which the appropriate DMA operations are performed to read all desired data from the DASD storage device.

Returning now to the main loop illustrated in FIG. 4B, if resident CL's are found or successfully initialized for all data in the read operation, then control will pass through step 156 to step 172, in which a cache hit or cache miss is registered. A cache hit is registered if all of the CL's for the operation were in resident, and thus all CL's on the working set queue are in the RIP state. If one or more CL's for the operation were not resident, and are in the PIP state, then a cache miss is registered.

At this point, the cache controller 31 is prepared to read the desired data from the cache and/or populate the cache from the storage device 28 and then read the data from the cache. It will be appreciated, however, that if (step 174) the cache controller is in its emulation mode, then the data cannot be read from the cache because there is no cache memory, and accordingly control passes to step 170 where, as noted above, appropriate DMA operations are performed to obtain the data from the storage device 28. If not in the emulation mode, control passes to step 176 and the operations described in FIG. 4C.

Figure 4C:
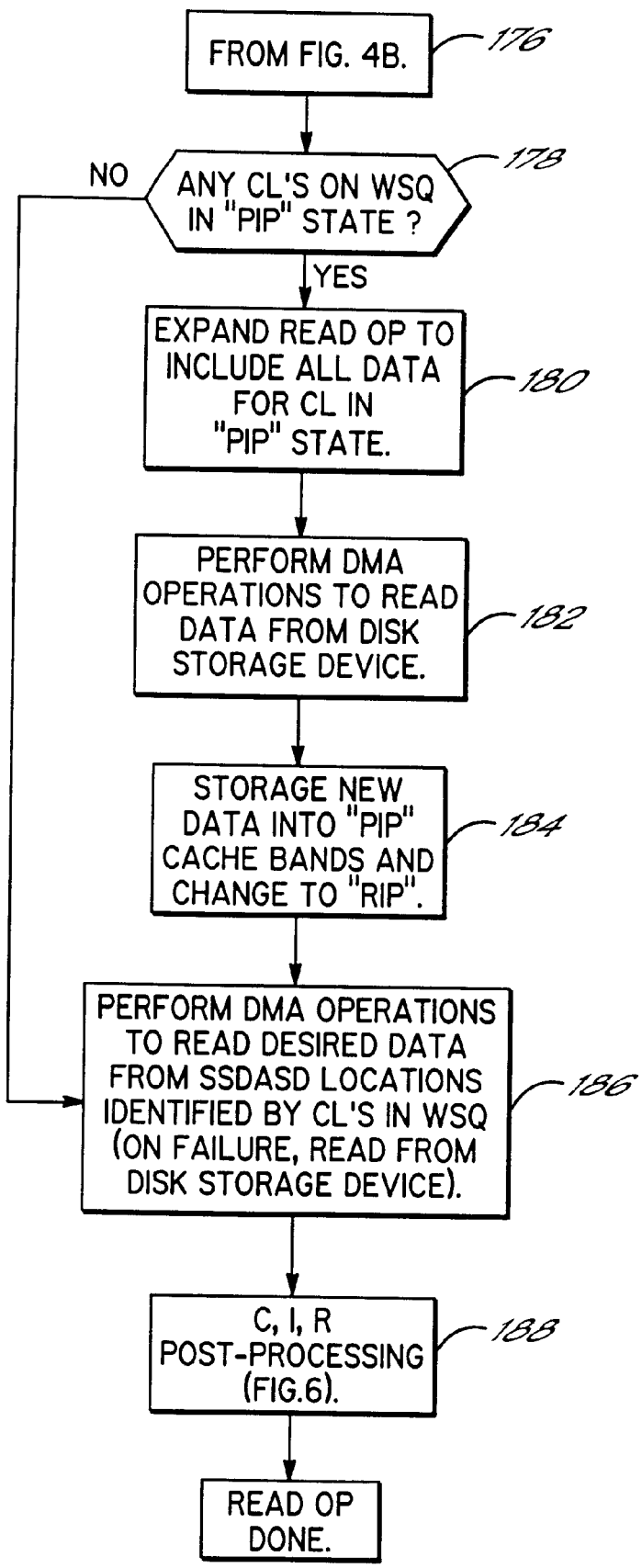

Referring now to FIG. 4C, processing continues by determining whether data must be populated into the cache from the storage device. Specifically, in step 178, it is determined whether any of the CL's on the working set queue for the current operation are in the PIP state. If so, in step 180, the range of addresses for the read operation is expanded to include the entire 256 kbyte range of the data band managed by the CL that is in the PIP state. Next, in step 182, DMA operations are performed to read the entire expanded range of data from the storage device 28. Note that, if the original read operation covered some data resident in the cache and some data not resident in the cache, any read operation to the storage device 28 will always include the data of the original read operation, potentially expanded to include additional data needed to populate a new band being brought into the cache. This does not substantially impact the performance of the computer system since a DASD typically can read contiguous storage spaces rapidly once the reading mechanism has been indexed to the correct location. This approach also permits graceful failure in case of a real-time failure or removal of SSDASD cache memory.

In step 184, the new data that was read for the bands managed by the CL record(s) in the PIP state, is stored into the cache. Specifically, this data is stored into the SSDASD cache memory band identified by field 58 of the CL record(s) in the PIP state. Thereafter, the CL records that were in the PIP state are changed to the RIP state, indicating that those records are available to be read.

After data has been written to the SSDASD cache memory, control passes from step 184 to step 186, in which the desired data is obtained from the SSDASD cache memory and delivered to the processor. In the situation where none of the CL records in the working set queue are in the PIP state, processing proceeds directly from step 178 to step 186.

In step 186, DMA operations are performed to obtain the desired data for the read operation from the SSDASD cache memory, from the SSDASD bands that are identified by field 58 in the CL record(s) in the working set queue. Under some circumstances, where SSDASD bands were populated through steps 180, 182 and 184, the desired data will be available in buffers in interface 26, and can be delivered to the processor directly. Otherwise, an appropriate DMA operation is conducted to access the desired data from the SSDASD, and then the data is returned to the processor.

It will be noted that, in the case of removal or failure of an SSDASD that has not yet been detected, the read from the cache memory in step 186 may fail. In this case an appropriate DMA operation is conducted to access the desired data from the storage device 28.

After step 186, collision, removal and invalidation postprocessing is performed in step 188, to appropriately handle any collisions and any pending removals or invalidations of CL's in the working set queue of the current read operation, as detailed in FIG. 6, discussed below. After this postprocessing is complete, the read operation is done.

Figure 5:
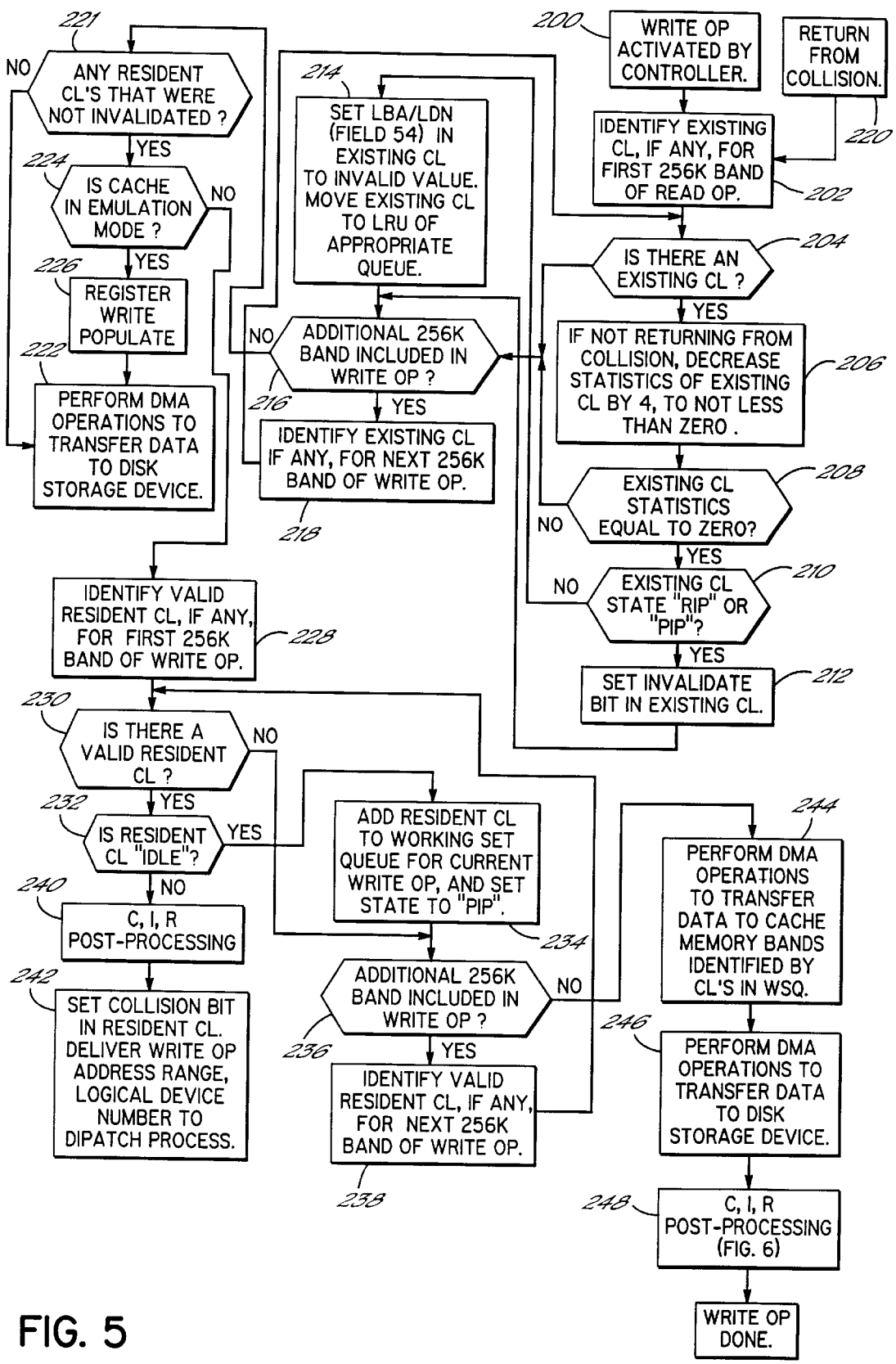
FIG. 5 is a flow chart of specific operations performed as part of responding to a write request, including checking for collisions, modifying statistics, determining whether one or more data bands in the cache should be invalidated, and performing DMA operations to store data from the processor and, if necessary, into bands in the cache memory.

Referring now to FIG. 5, when a write operation is activated by the auxiliary storage interface controller 31 (step 200), as a first step, the statistics in any CL records that are involved in the write operation are updated. Specifically, in step 202, the hash table is referenced to identify any CL in the cache directory for the first 256 kbyte band of the write operation, if any. If (step 204) there is a CL for the band, then in step 206 the statistics of the CL are penalized to reflect the write operation, specifically, the statistics in field 56 are decremented by 4 to not less than zero.

If, as a consequence of the penalty imposed in step 206, the statistics for a CL are reduced to zero, then the CL should not be retained in the cache directory. Accordingly, in step 208, it is determined whether the existing CL's statistics are zero, and if so, control passes to step 210. In step 210, it is determined whether there is a conflict that prevents the immediate invalidation of the CL. Specifically, if the CL is resident and in use by another operation at the present time, then the CL cannot be invalidated until the conflicting operation is completed. If the CL is resident and is in use, its state will be RIP or PIP; accordingly, if in step 210 the existing CL is in the RIP or PIP state, then control passes to step 212 and the invalidate bit in the existing CL is set, to indicate that the CL should be invalidated during postprocessing of the operation that is currently using the CL. If the existing CL is nonresident or is resident but IDLE, then the CL can be immediately invalidated. In this case, control passes from step 210 to step 214 and the logical band address/logical device number value in field 54 of the CL is set to an invalid value, and the CL is moved to the LRU end of the resident or nonresident LRU queue, as appropriate.

After step 212 or 214, or immediately after step 204 if there is no CL for a band of the write operation, it is determined in step 216 whether the write operation includes addresses in a second 256 kbyte band in storage device 28.

If so, in step 218, the hash table is utilized to identify any CL in the cache directory for the second 256 kbyte band, and then the processing returns to step 204 to take the appropriate action based on whether there is a CL in the cache.

It will be noted that, if a write operation is suspended due to a collision (as described below), after the collision is resolved the write operation will restart by proceeding from step 220 to step 202, to pass through the loop described above and determine whether there are CL's for the operation are in the cache directory, and invalidate CL's that should be invalidated. If the above-described operations are being performed after return from a collision, it is no longer necessary to update the statistics of CL's for a band that are present in the cache. Accordingly, after a return from the collision, the operations described in step 206 are not performed.

After all bands affected by a write operation have been processed by the loop described above, control passes from step 216 to step 221 in which it is determined whether any CL's in the cache must be updated as a consequence of the write operation. If there are no bands that have a resident CL in the cache directory that was not invalidated, then the cache does not need to be updated to complete the write operation. Accordingly, as noted above, under these circumstances the cache is not used, and control passes from step 221 to step 222 in which the appropriate DMA operations are performed to write all desired data to the DASD storage device 28.

If in step 221, there are resident CL's for some data for the write operation which have not been invalidated, then the cache must be updated. It will be appreciated, however, that if the cache is in emulation mode, then there is no cache memory and it need not be updated. Accordingly, if (step 224) the cache is in emulation mode, a write populate event may be registered (step 226) and then control passes to step 222. It will be appreciated that in addition to cache hits and cache misses, write populate events may be tracked when in emulation mode to collect statistics that permit a highly accurate estimate of the performance improvement, if any, that could be achieved were cache memory in place.

If the cache is not in emulation mode and must be updated as part of the write operation, control passes from step 221 to step 228. The following loop of steps in FIG. 5 are directed to detecting collisions between concurrent operations being performed in the cache. In each iteration of this loop, the cache directory is reviewed to identify whether there is an existing CL record in the cache directory managing data for the same storage device locations as the data being written as part of the current write operation, The loop begins in step 228 by identifying any existing CL record which is managing data for the first band of data being written by the current operation.

In step 230, it is determined whether the located CL record is valid and resident. If there is CL record that is valid and resident, in step 232 it is determined whether the CL is in the IDLE state. If the CL is in either the RIP or PIP state, there is a conflict between the current operation and another operation. If the CL is in the IDLE state, then there is no conflict, and in step 234 the CL is added to the working set queue for the current operation and its state is set to PIP to reflect that data will be populated into the cache from the write operation.

After step 234, or immediately after step 230 if there is no valid resident CL for a band, control passes to step 236 and the address range of the operation is analyzed to determine if there are any bands to be written that have not yet been checked for collisions. If there are additional bands to be checked, then the loop proceeds to step 238 and identifies the CL record which is managing data for the storage locations in the next band of data being written by the current operation. Processing then returns to step 230, to analyze this band for collisions.

If in steps 230 and 232 there is a CL record for a band being written that is valid, resident, and not in the IDLE state, there is a conflict between the current write operation and another operation. In this case, the conflict is resolved by stalling execution of the current write operation. Specifically, in the event of a conflict, control passes to step 240. In step 240, the collision, removal and invalidation processing described in FIG. 6 is performed, which will reset the state of any CL's added to the working set queue for the current write operation (in step 234) back to the IDLE state. Furthermore, if a CL that was placed in the PIP state in 234, experienced a collision with another concurrent operation in the time between step 234 and step 240, the post-processing in step 240 will perform the appropriate steps to clear the collision bit and restart the other operation. It will be noted that if the operations of FIG. 5 are performed in a single thread without concurrent processing, so that there could not be any collisions, invalidations or removals experienced or requested by other operations in the time between step 234 and step 240, it may not be necessary to perform collision post-processing, and step 240 could be limited to simply returning all CL records on the working set queue to the IDLE state.

After step 240, control passes to step 242, which sets the collision bit in the existing valid, resident and non-IDLE CL record that caused the collision. At the same time, the address range for the write operation, and the logical number of the storage device to which the operation is directed, are delivered to a dispatch process. This information is held in a queue, so that the dispatch process can subsequently re-activate the write operation when the collision is resolved, as described below. After stalling execution of the operation in this manner, processing of the write operation is completed until re-initiated by the dispatch process, at which time processing will re-commence at step 220, as discussed above.

Once every band of a write operation have been analyzed for collisions, as determined in step 236, then the cache controller 31 is prepared to write the desired data to the storage device and, if necessary, to the cache. Processing continues to step 244 where it is determined whether data must be written into the cache for the write operation. Specifically, in step 244, it is determined whether there are any CL's on the working set queue. If so, in step 244, DMA operations are performed to write the data for the write operation into the SSDASD band identified by field 58 of the CL(s) on the working set queue. Note that, if the SSDASD has been removed or failed, this write operation may fail; such a failure does not prevent continuation of the write operation.

After step 244, in step 246, DMA operations are performed to write the data for the write operation to the storage device 28. After data has been written to the DASD storage device, control passes from step 246 to step 248, in which collision, removal and invalidation post-processing is performed, to appropriately handle any collisions and any pending removals or invalidations of CL's in the working set queue of the current write operation, as detailed in FIG. 6, discussed below. After this post-processing is complete, the write operation is done.

Figure 6:
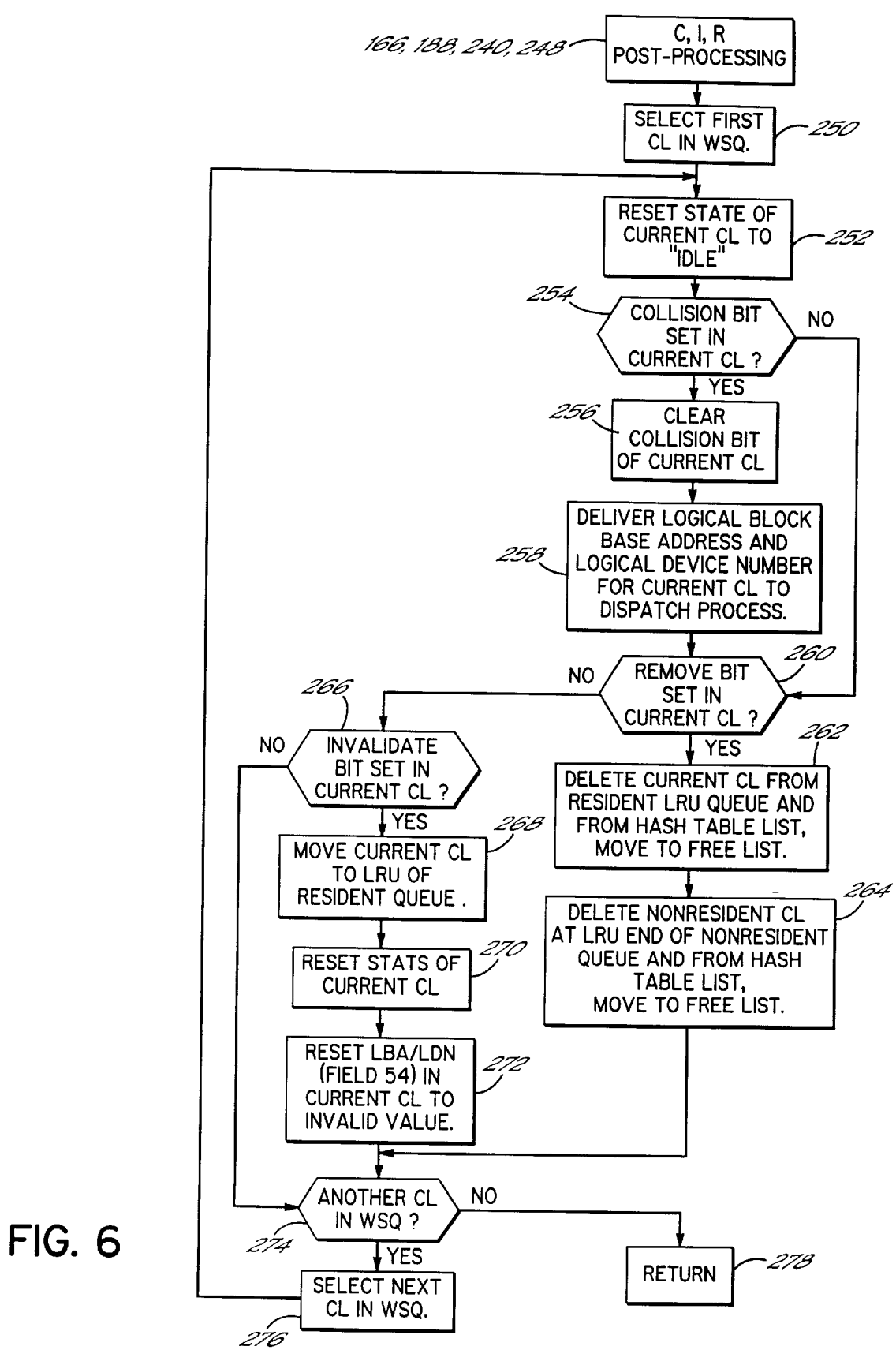
FIG. 6 is a flow chart of post-processing performed to resolve collisions incurred during a read or write operation and to invalidate or remove data bands from the cache which have been marked for invalidation or removal.

Referring now to FIG. 6, the details of the C,I,R post-processing can be provided. This processing involves inspecting each CL in the working set queue of the current operation, and handling any collisions or pending removals or invalidations indicated by the C, I and R flags in field 56 of the CL. In step 250, the first CL on the working set queue is selected, and in step 252 the state of this CL is returned to IDLE. Note that only resident CL's will be added to a working set queue so CL's on the working set queue will always be returned to IDLE state when an operation is completed.

Next, in step 254, the collision bit of the current CL is checked to determine whether another operation has experienced a collision with respect to the CL. If so, then in step 256, the collision bit is cleared, and then in step 258, the logical band address/logical device number from field 54 of the CL are delivered to the dispatch process. The dispatch process will then locate the operation(s) that experienced the collision, which operation(s) would have previously been enqueued by the dispatch process as discussed above. The dispatch process will then restart the stalled operation(s) that experienced the collision, as noted above. As a result, one operation will begin using the CL, and any other operation(s) which is restarted, will experience another collision and be stalled.

After step 258, or immediately after step 254 if the collision bit for the current CL was not set, in step 260 it is determined whether the remove bit is set in the current CL. If so, the current CL has been marked for removal due to failure or removal of the SSDASD that the current CL is associated with. Accordingly, if the remove bit is set, in step 262 the current CL is removed from the resident LRU queue and from its hash table list, and it is moved to the free list (see FIG. 3). Immediately thereafter, to maintain a balance of the number of resident and nonresident CL in the cache directory, in step 264 the nonresident CL at the LRU end of the nonresident LRU queue is removed from its hash table list and moved to the free list.

If the remove bit is not set in step 260, then control passes to step 266, in which it is determined whether the invalidate bit in the current CL is set. If the invalidate bit is set, then the CL has been marked for invalidation (e.g., in step 212 of FIG. 5, discussed above). In such a case, in step 268 the CL is moved to the LRU end of the resident queue, in step 270 the statistics of the CL are reset to zero, and in step 272 the logical band address/logical device number value in field 54 of the CL are reset to an invalid value.

After step 272 or 264, or immediately after step 266 if the invalidate bit is not set in the current CL, control passes to step 274 in which it is determined whether there is another CL in the working set queue for the current operation. This is done by determining whether the working set queue pointer in the current CL has a NIL value. If the working set queue pointer in the current CL has a non-NIL value, then control passes to step 276 in which the next CL in the working set queue is selected, after which control passes to step 252 to reset the next CL to the IDLE state and evaluate its flags for collisions and pending removals or invalidations. After all CL's in the working set queue have been processed, the post-processing is complete (step 278).

Figure 7:
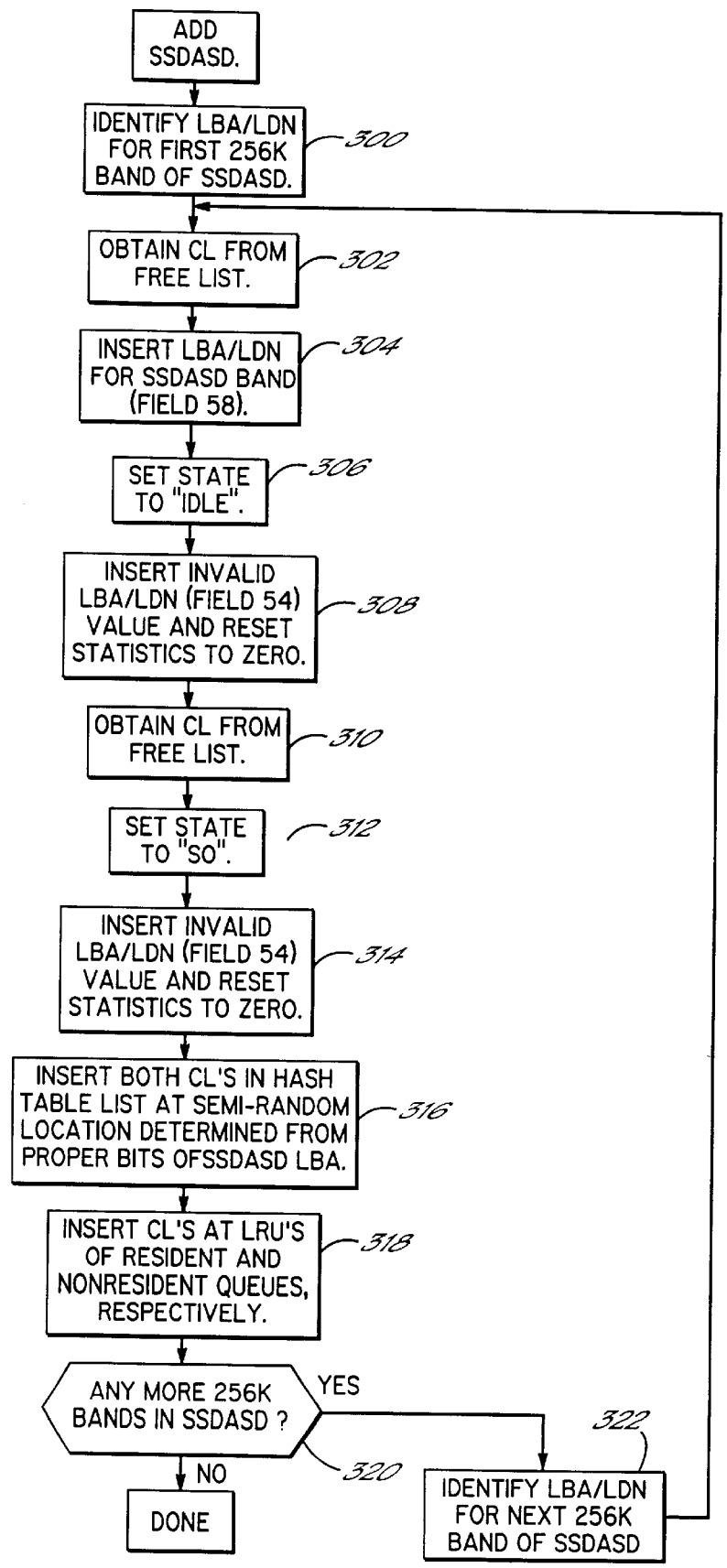
FIG. 7 is a flow chart of operations performed in response to the addition of cache memory, by adding corresponding control structures.

Referring now to FIG. 7, the procedures involved in adding a SSDASD of cache memory can be described. When an SSDASD is inserted into the computer system, the presence of the SSDASD on the SCSI bus 29 is detected by controller 31. In response, controller 31 initiates CL records for the bands of storage space in the SSDASD so they may be used as cache memory.

In a first step 300 of this process, the SSDASD logical band address/logical device number for the first band of the SSDASD is identified by the controller 31.

Next in step 302, a CL record is obtained from the free list, and in step 304 the logical band address/logical device number for the SSDASD band is inserted into field 58 of the CL record. Then, in step 306, the state of the CL record is set to IDLE, indicating that the CL will be a resident CL.

In step 308, an invalid logical band address/logical device number value is inserted into field 54 of the CL record, so that the CL record will be considered invalid. At the same time, the statistics for the CL record are reset to zero.

In step 310, a second CL is obtained from the free list. In step 312, the state of the second CL is set to SO, indicating that the second CL will be a nonresident CL.

In step 314, an invalid logical band address/logical device number value is inserted into field 54 of the CL record, so that the CL record will be considered invalid. At the same time, the statistics for the CL record are reset to zero.

In step 316, the two CL records from the free list that were initiated by the preceding steps, are inserted into one of the hash table lists. In order to avoid inserting all of the new CL records into the same hash table list, the two new CL records are inserted at a semi-randomly chosen location, Specifically, the proper number of bits (e.g., 17) from the SSDASD logical band address for the SSDASD band being added to the cache memory, are used to select a hash table entry. The two CL's from the free list are then added to the hash table list extending from the selected hash table entry.

In steps 308 and 314, the invalid logical band address/ logical device number values are inserted into field 54 of the two added CL records. In one specific embodiment, these invalid values may be derived from the logical band address for the SSDASD band that is being added. Specifically, the logical band address for the SSDASD band being added to the cache memory, is made invalid by modifying its most significant bit to a "1" value, and the result is inserted into field 54 of the two added CL's, along with the logical device number for the SSDASD. One consequence of this approach is that the logical band address in field 54 is consistent with the hash table entry into which the CL's are inserted.

In step 318, the initialization of the new CL's is completed by inserting the new CL's at the LRU end of the resident and nonresident LRU queues, respectively. At this point, the new CL's will be incorporated into the operation of the cache and the corresponding band of storage space in the newly-added SSDASD will begin to be used to store cached data.

After completing initialization for a band of the SSDASD by adding a resident and nonresident CL to the cache directory, in step 320 it is determined whether the SSDASD has additional 256 kbyte bands for which additional CL records should be initialized. If so, then in step 322 the SSDASD logical band address/logical device number for the next 256 kbyte band of the SSDASD is identified, and then processing returns to step 302 to initialize CL records for the next band. After CL records have been initialized for all bands of the newly added SSDASD, as determined in step 320, the process of FIG. 7 is done.

Figure 8:
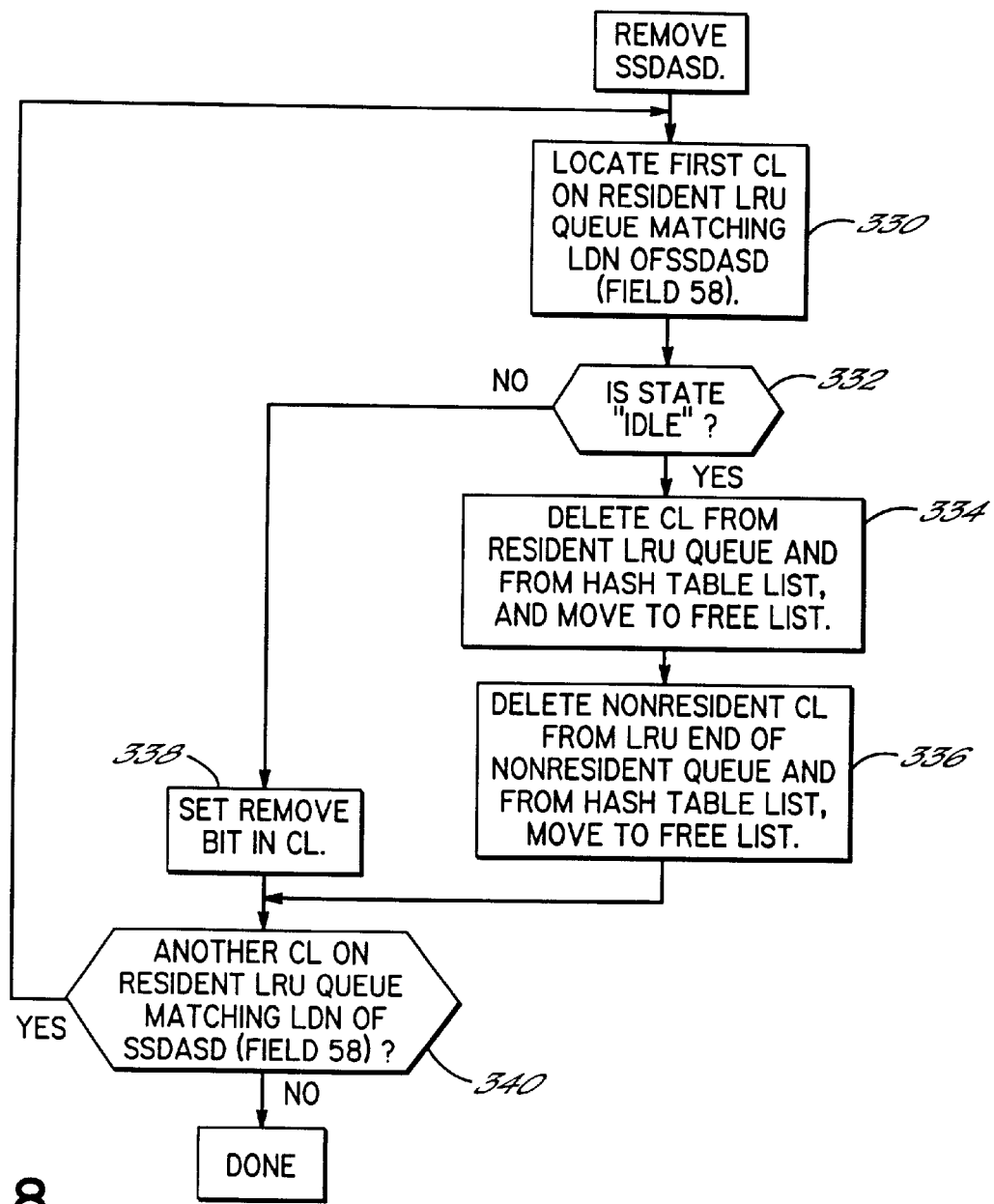
FIG. 8 is a flow chart of operations performed in response to the removal or failure of cache memory, by removing corresponding control structures.

Referring now to FIG. 8, the steps involved in removing an SSDASD from the cache memory can be described. These steps may be initiated when a read or write DMA operation to the SSDASD fails, indicating to the controller 31 that the SSDASD has either been removed or has failed. Alternatively, controller may permit a user to disable the SSDASD before it is removed or fails. In any case, the appropriate CL records must be removed from the cache directory.

The CL records that should be removed are located by scrolling through the resident LRU queue. Specifically, in step 330, the resident LRU queue is evaluated, starting at the MRU end, to locate the first CL on the resident LRU queue with a SSDASD logical device number value in field 58 that matches the logical device number of the SSDASD being removed. Once a CL with a matching SSDASD logical device number value has been found, in step 332, it is determined whether the CL is in the IDLE state. If so, then the CL can be immediately removed, and control proceeds to step 334. In step 334, the CL is deleted from the resident LRU queue and from its hash table list, and moved to the free list (see FIG. 3). Next, in step 336, to maintain a balance between the number of resident and nonresident CL's in the cache directory, a nonresident CL at the LRU end of the nonresident queue is removed from the nonresident LRU queue and from its hash table list, and moved to the free list.

If in step 332, a CL that is to be deleted is not in the IDLE state, then there is a conflict between the removal operation and another currently pending operation. Accordingly, in this situation control passes to step 338, and the remove bit is set in field 56 of the CL. This will cause the CL (and a nonresident CL) to be removed at the end of the conflicting operation, as detailed above with reference to FIG. 6.

After step 336 or step 338, the CL's on the resident LRU queue that follow (are less recently used than) the CL that was identified in step 330, are scanned to determine whether there is another CL on the resident LRU queue with an SSDASD logical device number value in field 58 which matches the logical device number of the SSDASD being removed. If so, then processing returns to step 330 to locate this CL and remove it or mark it for removal. After processing of all CL's on the resident LRU queue that have SSDASD logical device number values matching the logical device number value of the removed SSDASD, as determined in step 340, the removal process is done.

From the foregoing it will be appreciated that the invention provides significant advantages in management of a read cache, resulting in more efficient operation. It will also be appreciated that numerous modifications may be made to the disclosed embodiments consistent with the invention, without departing from the spirit and scope of the invention. For example, the size of the bands of data managed by the read cache may be different, the statistic value limits and the credits and penalties used may be different, and the threshold statistics for population and invalidation may be different. Furthermore, principles described above for managing an SSDASD cache in large, constant size bands, principles for efficient maintenance of statistics, and principles for real-time cache emulation, may be utilized in other types of caches, e.g., write caches. It will be further recognized that principles of the present invention are applicable to caches used in connection with storage devices of any kind, including disk or tape drives, or volatile or non-volatile memory and/or memory cards. Therefore, the invention lies in the claims hereinafter appended.

What is claimed is:

1. A method of caching data for a direct access storage device having a plurality of addressable locations, comprising the steps of:

storing, in a cache memory, copies of equally sized bands of data retrieved from said direct access storage device, each said band comprising a predetermined number of contiguous addressable locations on said direct access storage device spanning a plurality of sectors on said direct access storage device, responding to a request for access to a storage device location for which a copy is stored in the cache memory, by accessing the copy stored in the cache memory, and maintaining statistics on the type of access made and band in which the access is made, and responding to a request for access to a storage device location for which a copy is not stored in the cache memory, by retrieving data for a band of said predetermined number of contiguous addressable locations on said direct access storage device, the band including said desired storage device location and contiguous addressable locations adjacent thereto, storing said retrieved data for said retrieved band into said cache memory, and responding to the request for access to the desired storage device location by delivering a portion of the data that was retrieved from the storage device and stored in the cache memory.

2. The method of claim 1 wherein maintaining statistics on types of accesses made to bands of data comprises maintaining a counter associated with each monitored band of data, said counters being incremented or decremented in response to types of accesses made to the associated band of data.

3. A method of caching data for a direct access storage device having a plurality of addressable locations, comprising the steps of:

storing, in a cache memory, copies of data retrieved from said direct access storage device, monitoring accesses to resident data for which copies are stored in the cache memory, and to nonresident data for which copies are not stored in the cache memory, by maintaining statistics on types of accesses made to bands of data, responding to a request for access to a storage device location for which a copy is stored in the cache memory, by accessing the copy stored in the cache memory, and responding to a request for access to a storage device location for which a copy is not stored in the cache memory, by determining, based on monitored accesses, whether data for said storage device location for which a copy is not stored in the memory, should be made resident, and if not, accessing the location on said direct access storage device.

4. The method of claim 3 wherein monitoring accesses to data comprises maintaining a LRU queue in which data are ordered from most to least recently used.

5. The method of claim 3 wherein said data is arranged into blocks and accesses to data are monitored on a block-by-block basis, and maintaining statistics on types of accesses made to data comprises maintaining a counter associated with each monitored block of data, said counters being incremented or decremented in response to types of accesses made to the associated block of data.

6. The method of claim 5 wherein maintaining statistics further comprises incrementing said counter by a predetermined amount in response to a read to a block of data associated with said counter, and decrementing said counter by a predetermined amount in response to a write to a block of data associated with said counter.

7. The method of claim 3 wherein when responding to a request for access to a desired storage device location for which a copy is not stored in the cache memory, if it is determined that said desired storage location should be made resident, the method further comprises retrieving data for a predetermined number of contiguous addressable locations on said direct access storage device, including said desired storage device location and contiguous addressable locations adjacent thereto, identifying least advantageous data for which a copy is stored in the cache memory, based on previously monitored accesses to data, storing said retrieved data for said contiguous addressable locations, in said cache memory in place of the copy in said cache memory of said least advantageous data, and responding to the request for access to the desired storage device location by delivering a portion of the data that was retrieved from the storage device and stored in the cache memory.

8. The method of claim 3 further comprising maintaining a cache directory identifying data in said direct access storage device for which copies are stored in said cache memory, and identifying memory locations in said cache memory where each said copy is stored.

9. A method of caching data for a direct access storage device having a plurality of addressable locations, comprising the steps of:

storing, in a cache memory, copies of data retrieved from said direct access storage device, monitoring accesses to resident blocks of data for which copies are stored in the cache memory, and maintaining a resident LRU queue in which resident blocks of data are ordered from most to least recently used, and further maintaining statistics on types of accesses made to resident blocks of data in the form of a counter associated with each monitored block of data, said counters being incremented or decremented in response to types of accesses made to the associated data, responding to a request for access to a storage device location for which a copy is stored in the cache memory, by accessing the copy stored in the cache memory, and responding to a request for access to a storage device location for which a copy is not stored in the cache memory, by accessing the location on said direct access storage device.

10. The method of claim 9 wherein maintaining statistics further comprises incrementing said counter by a predetermined credit in response to a read to a block of data associated with said counter, and decrementing said counter by a predetermined penalty in response to a write to a block of data associated with said counter.

11. The method of claim 9 wherein accesses are monitored for nonresident blocks of data for which a copy is not stored in the cache memory, by maintaining a nonresident LRU queue in which nonresident blocks of data are ordered from most to least recently used, and further maintaining statistics on types of accesses made to nonresident blocks of data in the form of a counter associated with each monitored block of data, said counters being incremented or decremented in response to types of accesses made to the associated data.

12. The method of claim 11 wherein accesses are monitored for at least half as many nonresident blocks as resident blocks.

13. The method of claim 11 wherein responding to a request for access to a desired storage device location for which a copy is not stored in the cache memory, further comprises determining whether accesses are being monitored for a nonresident block including said desired storage device location, and if so, based on said statistics, determining whether a copy of said desired storage device location would advantageously be stored in said cache memory, and if so identifying a least advantageous resident block of data, and storing said retrieved data for said desired storage device location, in said cache memory in place of the copy in said cache memory of said least advantageous data.

14. The method of claim 13 wherein determining whether a copy of said desired storage device location would advantageously be stored in said cache memory and identifying least advantageous resident block of data, comprises determining whether statistics for said least recently used resident block of data exceed an aging threshold.

15. The method of claim 14 wherein when statistics for said least recently used resident block of data exceed said aging threshold, said retrieved data for said desired storage location is not stored in said cache memory, said least recently used resident block of data is made most recently used, and its statistics are penalized.

16. The method of claim 14 wherein when statistics for said least recently used resident block of data exceed said aging threshold, it is determined whether statistics of a next least recently used resident block exceed said aging threshold, and if not said next least recently used resident block is identified as the least advantageous resident block of data, and replaced with said retrieved data for said desired storage location.

17. The method of claim 13 further comprising, when accesses are not being monitored for said desired storage device location, initiating statistics for a nonresident block of data including said desired storage device location, and marking said nonresident block including said desired storage device location most recently used.

18. The method of claim 13 wherein determining whether a copy of said desired storage device location would advantageously be stored in said cache memory, comprises comparing statistics for a nonresident block of data including said desired storage device location, to a threshold value.

19. A cache control circuit of caching data for a direct access storage device having a plurality of addressable locations, the control circuit performing the steps of:
   storing, in a cache memory, copies of data retrieved from said direct access storage device,
   monitoring accesses to resident data for which copies are stored in the cache memory, and to nonresident data for which copies are not stored in the cache memory, by maintaining statistics on types of accesses made to bands of data,
   responding to a request for access to a storage device location for which a copy is stored in the cache memory, by accessing the copy stored in the cache memory, and
   responding to a request for access to a storage device location for which a copy is not stored in the cache memory, by determining, based on monitored accesses, whether data for said storage device location for which a copy is not stored in the memory, should be made resident, and if not, accessing the location on said direct access storage device.

20. The cache control circuit of claim 19 wherein monitoring accesses to data comprises maintaining a LRU queue in which data are ordered from most to least recently used.

21. The cache control circuit of claim 19 wherein said data is arranged into block and accesses to data are monitored on a block-by-block basis, and maintaining statistics on types of accesses made to data comprises maintaining a counter associated with each monitored block of data, said counters being incremented or decremented in response to types of accesses made to the associated block of data.

22. The cache control circuit of claim 21 wherein maintaining statistics further comprises incrementing said counter by a predetermined amount in response to a read to a block of data associated with said counter, and decrementing said counter by a predetermined amount in response to a write to a block of data associated with said counter.

23. A cache control circuit of caching data for a direct access storage device having a plurality of addressable locations, the control circuit performing the steps of:
   storing, in a cache memory, copies of data retrieved from said direct access storage device,
   monitoring accesses to resident blocks of data for which copies are stored in the cache memory, and maintaining a resident LRU queue in which resident blocks of data are ordered from most to least recently used, and further maintaining statistics on types of accesses made to resident blocks of data in the form of a counter associated with each monitored block of data, said counters being incremented or decremented in response to types of accesses made to the associated data,
   responding to a request for access to a storage device location for which a copy is stored in the cache memory, by accessing the copy stored in the cache memory, and
   responding to a request for access to a storage device location for which a copy is not stored in the cache memory, by accessing the location on said direct access storage device.

24. The cache control circuit of claim 22 wherein maintaining statistics further comprises incrementing said counter by a predetermined amount in response to a read to a block of data associated with said counter, and decrementing said counter by a predetermined amount in response to a write to a block of data associated with said counter.

25. The cache control circuit of claim 24 wherein accesses are monitored for at least half as many nonresident blocks as resident blocks.

26. The cache control circuit of claim 22 wherein accesses are monitored for nonresident blocks of data for which a copy is not stored in the cache memory, by maintaining a nonresident LRU queue in which nonresident blocks of data are ordered from most to least recently used, and further maintaining statistics on types of accesses made to nonresident blocks of data in the form of a counter associated with each monitored block of data, said counters being incremented or decremented in response to types of accesses made to the associated data.

27. A program product, comprising:
   (a) a program configured to perform a method of caching data for a direct access storage device having a plurality of addressable locations, the method comprising:
      storing, in a cache memory, copies of data retrieved from said direct access storage device,
      monitoring accesses to resident data for which copies are stored in the cache memory, and to nonresident data for which copies are not stored in the cache memory, by maintaining statistics on types of accesses made to bands of data,
      responding to a request for access to a storage device location for which a copy is stored in the cache memory, by accessing the copy stored in the cache memory, and
      responding to a request for access to a storage device location for which a copy is not stored in the cache memory, by determining, based on monitored accesses, whether data for said storage device location for which a copy is not stored in the memory, should be made resident, and if not, accessing the location on said direct access storage device; and (b) a signal bearing media bearing the program.

28. The program product of claim 25, wherein the signal bearing media is a transmission type media.

29. The program product of claim 25, wherein the signal bearing media is a recordable media.

30. A program product, comprising:

(a) a program configured to perform a method of caching data for a direct access storage device having a plurality of addressable locations, the method comprising:

storing, in a cache memory, copies of data retrieved from said direct access storage device, monitoring accesses to resident blocks of data for which copies are stored in the cache memory, and maintaining a resident LRU queue in which resident blocks of data are ordered from most to least recently used, and further maintaining statistics on types of accesses made to resident blocks of data in the form of a counter associated with each monitored block of data, said counters being incremented or decremented in response to types of accesses made to the associated data, responding to a request for access to a storage device location for which a copy is stored in the cache memory, by accessing the copy stored in the cache memory, and responding to a request for access to a storage device location for which a copy is not stored in the cache memory, by accessing the location on said direct access storage device; and (b) a signal bearing media bearing the program.

31. The program product of claim 29, wherein the signal bearing media is a transmission type media.

32. The program product of claim 29, wherein the signal bearing media is a recordable media.

* * * * *